US009878594B2

(12) United States Patent
Enomoto et al.

(10) Patent No.: US 9,878,594 B2
(45) Date of Patent: Jan. 30, 2018

(54) THERMAL MANAGEMENT SYSTEM FOR VEHICLE

(71) Applicant: DENSO CORPORATION, Kariya, Aichi-pref. (JP)

(72) Inventors: Norihiko Enomoto, Nagoya (JP); Nobuharu Kakehashi, Toyoake (JP); Michio Nishikawa, Nagoya (JP); Masamichi Makihara, Anjo (JP); Kazutoshi Kuwayama, Kariya (JP); Yoshiki Katoh, Kariya (JP); Kengo Sugimura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 506 days.

(21) Appl. No.: 14/423,666

(22) PCT Filed: Aug. 23, 2013

(86) PCT No.: PCT/JP2013/004986
§ 371 (c)(1),
(2) Date: Feb. 24, 2015

(87) PCT Pub. No.: WO2014/034062
PCT Pub. Date: Mar. 6, 2014

(65) Prior Publication Data
US 2015/0258875 A1 Sep. 17, 2015

(30) Foreign Application Priority Data

Aug. 28, 2012 (JP) .................................. 2012-187153
Jul. 3, 2013 (JP) .................................. 2013-139568

(51) Int. Cl.
*B60H 1/32* (2006.01)
*B60L 1/00* (2006.01)
(Continued)

(52) U.S. Cl.
CPC ............ *B60H 1/32* (2013.01); *B60H 1/00878* (2013.01); *B60H 1/08* (2013.01); *B60K 11/02* (2013.01);
(Continued)

(58) Field of Classification Search
CPC .... B60H 1/00; B60H 1/0021; B60H 1/00298; B60H 1/00385; B60H 1/00878;
(Continued)

(56) References Cited

U.S. PATENT DOCUMENTS 5,695,720 A * 12/1997 Wade ................... G01N 35/085
356/36
5,971,290 A 10/1999 Echigoya et al.
(Continued)

FOREIGN PATENT DOCUMENTS

EP 1059426 A2 12/2000
JP H10266855 A 10/1998
(Continued)

OTHER PUBLICATIONS

U.S. Appl. No. 14/423,665, Norihiko Enomoto et al., filed Feb. 24, 2015.
(Continued)

*Primary Examiner* — Len Tran
*Assistant Examiner* — Gustavo Hincapie Serna
(74) *Attorney, Agent, or Firm* — Harness, Dickey & Pierce, P.L.C.

(57) ABSTRACT

A thermal management system for a vehicle includes a first pump and a second pump, temperature adjustment target devices, heat exchangers, numerous flow paths including a first pump arrangement flow path, a second pump arrangement flow path, and device arrangement flow paths, a first switching portion for allowing the numerous flow paths to selectively communicate with each other, a second switch-
(Continued)

ing portion for allowing the numerous flow paths to selectively communicate with each other, and a reserve tank for storing therein heat medium. The reserve tank is configured to set the pressure of the liquid surface of the stored heat medium to a predetermined pressure (e.g., atmospheric pressure), and is connected to one flow path of the numerous flow paths.

22 Claims, 21 Drawing Sheets

(51) Int. Cl.
| | | |
|---|---|---|
| B60L 1/02 | (2006.01) | |
| B60L 3/00 | (2006.01) | |
| B60H 1/00 | (2006.01) | |
| B60H 1/08 | (2006.01) | |
| B60L 11/18 | (2006.01) | |
| B60K 11/02 | (2006.01) | |

(52) U.S. Cl.
CPC ............... B60L 1/003 (2013.01); B60L 1/02 (2013.01); B60L 3/00 (2013.01); B60L 3/0092 (2013.01); B60L 11/1874 (2013.01); B60H 1/00485 (2013.01); *B60L 2240/34* (2013.01); *B60L 2240/36* (2013.01); *B60L 2240/425* (2013.01); *B60L 2240/525* (2013.01); *B60L 2240/545* (2013.01); *B60L 2240/662* (2013.01); *Y02T 10/642* (2013.01); *Y02T 10/7005* (2013.01); *Y02T 10/705* (2013.01); *Y02T 10/7291* (2013.01); *Y02T 90/16* (2013.01)

(58) Field of Classification Search
CPC .... B60H 1/08; B60H 1/22; B60H 1/32; B60L 1/003; B60L 1/02; B60L 3/0092; B60L 3/00; B60L 11/874; B60L 2240/24; B60L 2240/36; B60L 2240/425; B60L 2240/525; B60L 2240/545; B60L 2240/662; B60K 11/02; Y02T 10/7005; Y02T 10/705; Y02T 90/16; Y02T 10/7291; Y02T 10/642
USPC ............... 165/41, 42, 96, 100, 101
See application file for complete search history.

(56) References Cited

U.S. PATENT DOCUMENTS

| | | | |
|---|---|---|---|
| 6,357,541 | B1 | 3/2002 | Matsuda et al. |
| 2002/0014330 | A1* | 2/2002 | Guyonvarch ...... B60H 1/00007 165/202 |
| 2008/0022710 | A1* | 1/2008 | Jeong ..................... F25B 13/00 62/324.6 |
| 2011/0113800 | A1* | 5/2011 | Sekiya ............... B60H 1/00278 62/151 |
| 2011/0192184 | A1* | 8/2011 | Yamashita ................ F24F 1/02 62/196.1 |
| 2011/0197608 | A1* | 8/2011 | Yamashita ................ F24F 3/06 62/190 |
| 2011/0296855 | A1 | 12/2011 | Johnston et al. |
| 2012/0180515 | A1* | 7/2012 | Morimoto .................. F24F 3/06 62/324.6 |
| 2012/0205088 | A1 | 8/2012 | Morisita et al. |
| 2012/0222441 | A1 | 9/2012 | Sawada et al. |
| 2013/0098092 | A1* | 4/2013 | Wakamoto ................ F25B 1/10 62/278 |
| 2014/0096557 | A1* | 4/2014 | Higashiiue .............. F25B 13/00 62/324.6 |
| 2014/0374081 | A1* | 12/2014 | Kakehashi ............. B60K 11/02 165/202 |
| 2015/0000327 | A1* | 1/2015 | Kakehashi .............. F25D 17/02 62/434 |
| 2015/0101789 | A1* | 4/2015 | Enomoto ........... B60H 1/00485 165/202 |
| 2015/0273976 | A1* | 10/2015 | Enomoto ................. B60K 6/22 165/202 |

FOREIGN PATENT DOCUMENTS

| | | |
|---|---|---|
| JP | H10266856 A | 10/1998 |
| JP | H10297261 A | 11/1998 |
| JP | 2009202794 A | 9/2009 |
| JP | 2010272289 A | 12/2010 |
| JP | 2011112312 A | 6/2011 |
| JP | 2011121551 A | 6/2011 |
| JP | 2011157035 A | 8/2011 |
| JP | 2011255879 A | 12/2011 |
| WO | WO-2014034061 A1 | 3/2014 |

OTHER PUBLICATIONS

International Search Report and Written Opinion (in Japanese with English Translation) for PCT/JP2013/004986, dated Nov. 19, 2013; ISA/JP.

* cited by examiner

THERMAL MANAGEMENT SYSTEM FOR VEHICLE

CROSS REFERENCE TO RELATED APPLICATIONS

This application is a U.S. National Phase Application under 35 U.S.C. 371 of International Application No. PCT/JP2013/004986 filed on Oct. 23, 2013 and published in Japanese as WO 2014/034062 A1 on Mar. 6, 2014. This application is based on and claims the benefit of priority from Japanese Patent Applications No. 2012-187153 filed on Aug. 28, 2012, and No. 2013-139568 filed on Jul. 3, 2013. The entire disclosures of all of the above applications are incorporated herein by reference.

FIELD OF THE INVENTION

The preset disclosure relates to a thermal management system used for a vehicle.

BACKGROUND ART

Conventionally, as disclosed in Patent Document 1, a thermal management system includes a first coolant loop for exchanging heat with a battery system, a second coolant loop for exchanging heat with at least one drive train component, and a valve for switching between a first mode of operating the two coolant loops in parallel and a second mode of operating the two coolant loops in series.

In the related art, the first coolant loop includes a first coolant reservoir, and the second coolant loop includes a second coolant reservoir. The first reservoir and the second reservoir are integrated together into a single dual-loop reservoir.

The coolant reservoir integrated as the single dual-loop reservoir is provided with a coolant passage for connecting chambers for the first and second coolant reservoirs. The single coolant reservoir allows the coolant to flow through between the first coolant reservoir and the second coolant reservoir.

RELATED ART DOCUMENT

Patent Document

Patent Document 1: Japanese Unexamined Patent Application Publication No. 2011-255879

SUMMARY OF INVENTION

As a result of studies by the inventors of the present application, if there is a difference in pump output between the respective coolant loops in the first mode of operating the two coolant loops in parallel, a leak of the coolant may occur inside the valve. When the leak of the coolant occurs inside the valve, a small amount of coolant will continue to flow from one coolant loop with the high pump output at a high pressure to the other coolant loop with the low pump output at a low pressure.

The two coolant loops form a closed circuit to which the coolant cannot be supplied from the outside. Thus, when a small amount of coolant continues to flow from the high-pressure side coolant loop to a low-pressure side coolant loop, the amount of liquid in the high-pressure side coolant loop continues to decrease, while the amount of liquid in the low-pressure side coolant continues to increase. As a result, the water level of the coolant in the low-pressure side chamber in the reserve tank continues to rise to push up the liquid surface thereof.

When the liquid surface of the coolant in the low-pressure side chamber reaches the level of a coolant passage, the coolant in the low-pressure side chamber flows into the high-pressure side chamber. Thus, a local loop circuit is formed between the reserve tank and the valve, which might waste the power from a pump or compressor.

Further, the above thermal management system in the related art just switches the two coolant loops between the series connection and parallel connection, and thus cannot arbitrarily switch and circulate a heat medium in a different temperature zone according to a temperature adjustment target device. As a result, it is difficult to adjust the temperature adjustment target device to an appropriate temperature depending on the situation.

The present disclosure has been made in view of the foregoing matters, and it is an object of the present disclosure to provide a thermal management system for a vehicle, which can suppress formation of a local loop circuit by a reserve tank, while switching a heat medium circulating through the temperature adjustment target device.

It is another object of the present disclosure to be capable of maintaining the pressure of a heat medium circuit within a predetermined range in a heat management system for a vehicle in which a plurality of heat medium circuits are formed by selectively connecting numerous flow paths together.

In order to achieve the above-mentioned object, a heat management system for a vehicle according to the present disclosure includes a first pump and a second pump, a temperature adjustment target device, a heat exchanger, numerous flow paths, a first switching portion, a second switching portion, and a reserve tank. The first and second pumps suck and discharge a liquid heat medium. The temperature adjustment target device has a temperature adjusted by the heat medium. The heat exchanger exchanges heat with the heat medium. The numerous flow paths are flow paths for circulation of the heat medium, and include a first pump arrangement flow path in which the first pump is disposed, a second pump arrangement flow path in which the second pump is disposed, and a device arrangement flow path in which at least one of the temperature adjustment target device and the heat exchanger is disposed. The first switching portion is connected to one end side of each of the numerous flow paths, and adapted to selectively establish communication between the numerous flow paths. The second switching portion is connected to the other end side of each of the numerous flow paths, and adapted to selectively establish communication between the numerous flow paths. The reserve tank stores therein the heat medium.

Furthermore, at least one of the numerous flow paths communicates with the first pump arrangement flow path to form a first heat medium circuit. The first switching portion and the second switching portion are operated such that at least another one of the numerous flow paths communicates with the second pump arrangement flow path to form a second heat medium circuit. The reserve tank is configured to set a pressure of a liquid surface of the heat medium stored to a predetermined pressure, and is connected to only one of the numerous flow paths.

Thus, the first and second switching portions can switch the communication state among the numerous flow paths to thereby switch the heat medium circulating through the temperature adjustment target device.

Further, the reserve tank is connected to only one flow path of the numerous flow paths, and thereby it can suppress the reserve tank from forming a local loop circuit.

Alternatively, a heat management system for a vehicle according to the present disclosure may include a first pump, a second pump, and a third pump, a temperature adjustment target device, a heat exchanger, numerous flow paths, a first switching portion, a second switching portion, a reserve tank, a circulation flow path, and at least one connection flow paths. The first, second, and third pumps suck and discharge the liquid heat medium. The temperature adjustment target device has the temperature adjusted by the heat medium. The heat exchanger exchanges heat with the heat medium. The numerous flow paths are flow paths for circulation of the heat medium, and include a first pump arrangement flow path in which the first pump is disposed, a second pump arrangement flow path in which the second pump is disposed, and a device arrangement flow path in which at least one of the temperature adjustment target device and the heat exchanger is disposed. The first switching portion is connected to one end side of each of the numerous flow paths, and adapted to selectively establish communication between the numerous flow paths. The second switching portion is connected to the other end side of each of the numerous flow paths, and adapted to selectively establish communication between the numerous flow paths. The reserve tank stores therein the heat medium. The circulation flow path is provided with the third pump to allow the heat medium to circulate therethrough. The connection flow path is provided with the third pump, thereby connecting the circulation flow path through which the heat medium circulates to at least one of the numerous flow paths.

Furthermore, at least one of the numerous flow paths communicates with the first pump arrangement flow path to form a first heat medium circuit. The first switching portion and the second switching portion are adapted to operate such that at least another one of the numerous flow paths communicates with the second pump arrangement flow path to form a second heat medium circuit. The reserve tank is connected to the circulation flow path such that a pressure of a liquid surface of the heat medium stored becomes a predetermined pressure.

Thus, the first and second switching portions can switch the communication state among the numerous flow paths to thereby switch the heat medium circulating through the temperature adjustment target device.

Further, the reserve tank is connected to only one flow path of the numerous flow paths via the circulation flow path, and thereby it can suppress the reserve tank from forming a local loop circuit.

Alternatively, a thermal management system for a vehicle according to the present disclosure may include a first pump and a second pump, a temperature adjustment target device, a heat exchanger, numerous flow paths, a first switching portion, a second switching portion, one or two reserve tanks, and a pressure adjustment valve. The first and second pumps suck and discharge the liquid heat medium. The temperature adjustment target device has the temperature adjusted by the heat medium. The heat exchanger exchanges heat with the heat medium to thereby change the temperature of the heat medium. The numerous flow paths are flow paths for circulation of the heat medium, and include a first pump arrangement flow path in which the first pump is disposed, a second pump arrangement flow path in which the second pump is disposed, and a device arrangement flow path in which at least one of the temperature adjustment target device and the heat exchanger is disposed. The first switching portion is connected to one end side of each of the numerous flow paths, and adapted to selectively establish communication between the numerous flow paths. The second switching portion is connected to the other end side of each of the numerous flow paths, and adapted to selectively establish communication between the numerous flow paths. The reserve tank is connected to a predetermined flow path among the numerous flow paths to store therein the heat medium. The pressure adjustment valve opens when an internal pressure of the flow path with the reserve tank connected thereto among the numerous flow paths, or an internal pressure of the reserve tank exceeds the predetermined range.

Furthermore, at least one of the numerous flow paths communicates with the first pump arrangement flow path to form a first heat medium circuit. The first switching portion and the second switching portion are operated such that at least another one of the numerous flow paths communicates with the second pump arrangement flow path to form a second heat medium circuit.

Thus, when the internal pressure of the flow path with the reserve tank connected thereto among the numerous flow paths, or an internal pressure of the reserve tank exceeds the predetermined range, the pressure adjustment valve can close to maintain the pressure of the heat medium circuit within a predetermined range.

Alternatively, a heat management system for a vehicle according to the present disclosure may include a first pump, a second pump, and a third pump, a temperature adjustment target device, a heat exchanger, numerous flow paths, a first switching portion, a second switching portion, a circulation flow path, at least one connection flow path, one or two reserve tanks, and a pressure adjustment valve. The first, second, and third pumps suck and discharge the liquid heat medium. The temperature adjustment target device has a temperature adjusted by the heat medium. The heat exchanger exchanges heat with the heat medium to change the temperature of the heat medium. The numerous flow paths are flow paths for circulation of the heat medium, and include a first pump arrangement flow path in which the first pump is disposed, a second pump arrangement flow path in which the second pump is disposed, and a device arrangement flow path in which at least one of the temperature adjustment target device and the heat exchanger is disposed. The first switching portion is connected to one end side of each of the numerous flow paths, and adapted to selectively establish communication between the numerous flow paths. The second switching portion is connected to the other end side of each of the numerous flow paths, and adapted to selectively establish communication between the numerous flow paths. The circulation flow path is provided with the third pump to allow the heat medium to circulate therethrough. The connection flow path connects at least one of the numerous flow paths to the circulation flow path. The reserve tank is connected to a predetermined flow path among the numerous flow paths and the circulation flow paths, thereby storing therein the heat medium. The pressure adjustment valve opens when an internal pressure of the predetermined flow path or an internal pressure of the reserve tank exceeds a predetermined range.

Furthermore, at least one of the numerous flow paths communicates with the first pump arrangement flow path to form a first heat medium circuit. The first switching portion and the second switching portion are operated such that at least another one of the numerous flow paths communicates with the second pump arrangement flow path to form a second heat medium circuit.

Thus, when the internal pressure of the flow path with the reserve tank connected thereto among the numerous flow paths and the circulation flow paths, or an internal pressure of the reserve tank exceeds the predetermined range, the pressure adjustment valve can close to maintain the pressure of the heat medium circuit within a predetermined range.

DESCRIPTION OF EMBODIMENTS

Figure 1:
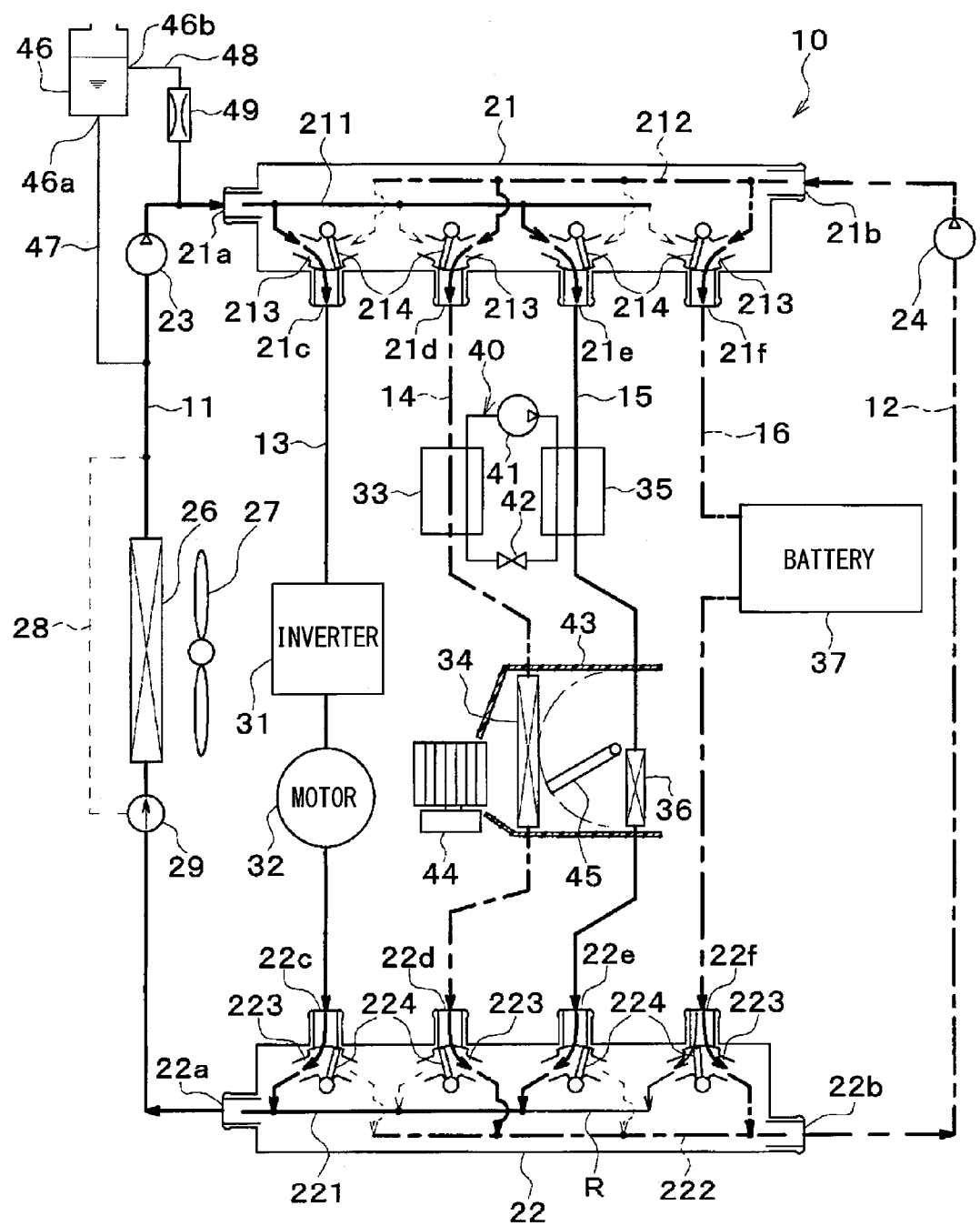
FIG. 1 is an entire configuration diagram of a thermal management system for a vehicle according to a first embodiment of the invention.

In the following, preferred embodiments of the present invention will be described with reference to the accompanying drawings. The same or equivalent parts in the embodiments below are indicated by the same reference characters throughout the figures.

(First Embodiment)

Now, a first embodiment of the invention will be described. A thermal management system 10 for a vehicle shown in FIG. 1 is used to cool various temperature adjustment target device included in a vehicle (devices requiring cooling or heating) to an appropriate temperature.

In the first embodiment, the thermal management system 10 is applied to a hybrid vehicle that can obtain the driving force for traveling from both an engine (internal combustion engine) and a motor for traveling.

The hybrid vehicle can switch between a traveling state (HV traveling) in which a vehicle can travel by obtaining a driving force from both the engine and electric motor for traveling by causing the engine to operate or stop according to a traveling load on the vehicle and a remaining storage energy of a battery or the like, and another traveling state (EV traveling) in which the vehicle can travel by obtaining a driving force only from the electric motor for traveling by stopping the engine 10. Thus, the hybrid vehicle of this embodiment can improve the fuel efficiency as compared to the vehicle with only the engine as a drive source for traveling.

Further, the hybrid vehicle is configured as a plug-in hybrid car that can charge a battery (vehicle-mounted battery) mounted on the vehicle, with power supplied from an external power source (commercial power source) during stopping of the vehicle. For example, a lithium ion battery can be used as the battery.

A driving force output from an engine is used not only for traveling of the vehicle, but also for operating a generator. Power generated by the generator and power supplied from the external power source can be stored in the battery. The power stored in the battery can be supplied not only to the motor for traveling, but also to various vehicle-mounted devices, such as electric components included in a cooling system.

As shown in FIG. 1, the thermal management system 10 includes numerous flow paths 11 to 16, a first switching valve 21, a second switching valve 22, a first pump 23, a second pump 24 (a plurality of pumps), and a radiator 26 (heat exchanger).

A number of flow paths 11 to 16 are coolant flow paths through which the coolant flows. The flow paths 11 to 16 are formed of a solid pipe made of resin material (nylon, polyphthalamide, or the like), metal material (SUS), etc., a hose pipe made of rubber material (EPDM), or the like.

The coolant is a fluid as the thermal medium. A liquid containing at least ethylene glycol, dimethylpolysiloxane, or a nano-fluid is used as the coolant.

The numerous flow paths 11 to 16 each have one end side thereof connected to the first switching valve 21, and the other end side thereof connected to the second switching valve 22.

The first switching valve 21 has a first inlet 21a and a second inlet 21b into which the coolant flows, and a first outlet 21c, a second outlet 21d, a third outlet 21e, and a fourth outlet 21f from which the coolant flows. The first switching valve 21 is a first switch for switching among communication states between the first and second inlets 21a and 21b and the first to fourth outlets 21c, 21d, 21e, and 21f.

The first inlet 21a is connected to one end side of the first flow path 11 among the numerous flow paths 11 to 16. The second inlet 21b is connected to one end side of the second flow path 12 among the numerous flow paths 11 to 16.

The first outlet 21c is connected to one end side of the third flow path 13 among the numerous flow paths 11 to 16. The second outlet 21d is connected to one end side of the fourth flow path 14 among the numerous flow paths 11 to 16. The third outlet 21e is connected to one end side of the fifth flow path 15 among the numerous flow paths 11 to 16. The fourth outlet 21f is connected to one end side of the sixth flow path 16 among the numerous flow paths 11 to 16. Thus, the first switching valve 21 allows the numerous flow paths 11 to 16 to selectively communicate with each other.

The second switching valve 22 has a first outlet 22a and a second outlet 22b from which the coolant flows, and a first inlet 22c, a second inlet 22d, a third inlet 22e, and a fourth inlet 22f into which the coolant flows. The second switching valve 22 is a second switch for switching the communication state among the first and second outlets 22a and 22b and the first to fourth inlets 22c to 22f.

The first outlet 22a is connected to the other end side of the first flow path 11 among the numerous flow paths 11 to 16. The second outlet 22b is connected to the other end side of the second flow path 12 among the numerous flow paths 11 to 16.

The first inlet 22c is connected to the other end side of the third flow path 13 among the numerous flow paths 11 to 16. The second inlet 22d is connected to the other end side of the fourth flow path 14 among the numerous flow paths 11 to 16. The third inlet 22e is connected to the other end side of the fifth flow path 15 among the numerous flow paths 11 to 16. The fourth inlet 22f is connected to the other end side of the sixth flow path 16 among the numerous flow paths 11 to 16. Thus, the second switching valve 22 allows the numerous flow paths 11 to 16 to selectively communicate with each other.

Each of the first pump 23 and the second pump 24 is an electric pump for sucking and discharging the coolant. The first pump 23 is disposed in the first flow path 11 (first pump arranged flow path), and the second pump 24 is disposed in the second flow path 12 (second pump arranged flow path). Both the first pump 23 and the second pump 24 are arranged to allow the coolant to be sucked from a side of the second switching valve 22 and discharged toward a side of the first switching valve 21.

The radiator 26 is a heat exchanger (air-heat medium heat exchanger) for heat dissipation that dissipates heat of the coolant into the outside air by exchanging the heat between the coolant and the air outside the vehicle compartment (hereinafter referred to as an outside air). The radiator 26 is disposed between the first pump 23 and the second switching valve 22 in the first flow path 11.

Although not shown in the figure, the radiator 26 is disposed at the foremost part of the vehicle. The outside air is blown to the radiator 26 by an exterior blower 27. During traveling of the vehicle, the radiator 26 can face the traveling air.

A part of the first flow path 11 on the side of the second switching valve 22 with respect to the radiator 26 is connected to one end side of a bypass flow path 28 via a three-way valve 29. Another part of the first flow path 11 on the side of the first switching valve 21 with respect to the radiator 26 is connected to the other end side of the bypass flow path 28. The three-way valve 29 switches between the flow of the heat medium in the first flow path 11 through the radiator 26, and the flow of the heat medium through the bypass flow path 28.

In the third flow path 13 (device arrangement flow path), an inverter 31 and an electric motor 32 for traveling which are temperature adjustment target devices are arranged in series. A multi-way valve (not shown) may be disposed to control the distribution of the flow paths so as to timely switch between the parallel connection and series connection as the arrangement relationship between the inverter 31 and the motor 32, and/or to timely restrict one of the flow rates of the inverter 31 and the motor 32.

The inverter 31 is a power conversion device that converts a direct-current (DC) power supplied from the battery to an alternating-current (AC) power to output the AC voltage to an electric motor for traveling, thereby constituting a power control unit.

The power control unit is a component for controlling the output from the battery so as to drive the motor for traveling. The power control unit includes a booster converter for increasing the voltage of the battery, and the like, in addition to the inverter 31.

Inside the inverter 31, a coolant flow path for allowing the coolant to flow therethrough is formed, whereby the inverter 31 is cooled by flowing the coolant in the coolant flow path. The inverter 31 preferably has its temperature maintained at 65° C. or lower in terms of thermal damage to the semiconductor element therein, and for the purpose of preventing the degradation thereof, and the like.

The electric motor 32 for traveling has functions of serving as an electric motor (motor) for converting an electric energy into a mechanical energy, such as rotation of an output shaft, and of serving as an electric generator (generator) for converting the rotation of the output shaft (mechanical energy) into an electric energy.

In the fourth flow path 14 (device arrangement flow path), an chiller 33 as a heat exchanger and a cooler core 34 as temperature adjustment target device are arranged in series to each other. The chiller 33 is a heat exchanger for coolant cooling (heat medium cooler) that cools the coolant by exchanging heat between a low-pressure refrigerant (low-temperature refrigerant) of a refrigeration cycle 40 and the coolant. The cooler core 34 is a heat exchanger for air cooling (air heat medium heat exchanger) that cools the air by exchanging heat between the coolant cooled by the chiller 33 and the air to be blown into the vehicle interior.

A multi-way valve (not shown) may be disposed to control the distribution of the flow paths so as to timely switch between the parallel connection and series connection as the arrangement relationship between the cooler core 34 and the chiller 33, and/or to timely restrict one of the flow rates of the cooler core 34 and the chiller 33.

In the fifth flow path 15 (device arrangement flow path), a condenser 35 as a heat exchanger and a heater core 36 as temperature adjustment target device are arranged in series to each other. The condenser 35 is a heat exchanger for coolant heating (heat medium heater) that heats the coolant by exchanging heat between the coolant and a high-pressure refrigerant (high-temperature refrigerant) of the refrigeration cycle 40. The heater core 36 is a heat exchanger for air heating (air heat medium heat exchanger) that heats the air by exchanging heat between the coolant cooled by the condenser 35 and the air blown into the vehicle interior.

A multi-way valve (not shown) may be disposed to control the flow paths so as to timely switch between the parallel connection and series connection of the arrangement relationship between the heater core 36 and the condenser 35, or to timely restrict one of the flow rates at the heater core 36 and the condenser 35, or so as to open and close the communication with a connection flow path 107.

In the sixth flow path 16 (device arrangement flow path), the battery 37 as the temperature adjustment target device is disposed. Inside the battery 37, a flow path for a battery that allows the coolant to flow therethrough is formed, whereby the battery 37 is cooled by flowing the coolant through the flow path for the battery. The battery 37 preferably has its temperature maintained to about 10 to 40° C. for the purpose of preventing the reduction in output, charging efficiency, degradation, and the like.

In the sixth flow path 16, a heat exchanger for battery cooling may be provided for cooling or heating the battery 37 by exchanging heat between the coolant (heat medium) and air, instead of the battery 37, to guide the air to the battery 37.

The refrigeration cycle 40 is a vapor compression refrigerator. In this embodiment, the refrigeration cycle 40 employs a fluorocarbon refrigerant as the refrigerant, and thus forms a subcritical refrigeration cycle whose high-pressure side refrigerant pressure does not exceed the critical pressure of the refrigerant.

The refrigeration cycle 40 includes not only the chiller 33 serving as a low-pressure side heat exchanger and the condenser 35 serving as a high-pressure side heat exchanger, but also a compressor 41 and an expansion valve 42.

The compressor 41 is an electric compressor driven by an electric power supplied from the battery. The compressor 41 is adapted to suck gas-phase refrigerant and to compress and discharge the refrigerant. The compressor 41 may be rotatably driven by the engine via a pulley, a belt, and the like. The high-temperature and high-pressure gas-phase refrigerant discharged from the compressor 41 exchanges heat with the coolant by the condenser 35 as the high-pressure side heat exchanger to have its heat absorbed to be condensed.

The expansion valve 42 is a decompressor for decompressing and expanding a liquid-phase refrigerant condensed by the condenser 35. The refrigerant decompressed and expanded by the expansion valve 42 exchanges heat with the coolant in the chiller 33 to absorb heat from the coolant and to evaporate itself. The gas-phase refrigerant evaporated at the chiller 33 is sucked into and compressed by the compressor 41.

The refrigeration cycle 40 may be provided with an internal heat exchanger (not shown) for exchanging heat between the refrigerant discharged from the condenser 35 and the refrigerant discharged from the chiller 33.

The chiller 33 cools the coolant by the low-pressure refrigerant in the refrigeration cycle 40, and thus can cool the coolant to a lower temperature as compared to the radiator 26 for cooling the coolant with the outside air.

Specifically, the radiator 26 cannot cool the coolant to a temperature lower than that of the outside air, whereas the chiller 33 can cool the coolant to a temperature lower than that of the outside air.

The cooler core 34 and the heater core 36 are disposed in an air passage formed inside a casing 43 of an interior air conditioning unit. Specifically, in the air passage within the casing 43, the heater core 36 is disposed on the downstream side of the air flow with respect to the cooler core 34.

Through the air passage within the casing 43, the air blown by an interior blower 44 flows. An air mix door 45 is disposed in between the cooler core 34 and the heater core 36 within the casing 43. The air mix door 45 serves as an air volume ratio adjuster that adjusts a ratio of the air volume of the air passing through the heater core 36 to that of the air bypassing the cooler core 34.

A reserve tank 46 is connected to the first flow path 11. Specifically, the reserve tank 46 includes a main inflow-outflow port 46a and a sub-inflow-outflow port 46b as an inflow-outflow port for inflow and outflow of the coolant. The main inflow-outflow port 46a is connected to a part of the first flow path 11 between the radiator 26 and the first pump 23 via a main connection flow path 47. The sub-inflow-outflow port 46b is connected to a part of the first flow path 11 between the first pump 23 and the first switching valve 21 via a sub-connection flow path 48.

The main connection flow path 47 and the sub-connection flow path 48 are flow paths for circulation of the coolant. Each of the main connection flow path 47 and the sub-connection flow path 48 is a tank connection flow path for connecting the reserve tank 46 to a predetermined flow path.

The sub-connection flow path 48 is provided with a flow path throttle 49. Thus, the flowing resistance of the sub-connection flow path 48 (resistance of the flow of coolant) is larger than that of the main connection flow path 47. Instead of the flow path throttle 49, a shut valve capable of closing the flow path may be disposed in the sub-connection flow path 48.

The reserve tank 46 is an air-release container (heat medium storage) for storing the coolant therein. Thus, the pressure at the liquid surface of the coolant stored in the reserve tank 46 becomes atmospheric pressure. The reserve tank 46 may be configured such that the pressure at the liquid surface of the coolant stored in the reserve tank 46 becomes a predetermined pressure (pressure different from the atmospheric pressure).

Excessive coolant is stored in the reserve tank 46, and thereby it can suppress the decrease in liquid amount of the coolant circulating through the respective flow paths. The reserve tank 46 has a function of separating the air bubbles mixed in the coolant, into gas and liquid components.

Because the flow path throttle 49 is disposed in the sub-connection flow path 48, it can suppress the flow of the coolant from the first flow path 11 into the reserve tank 46 through the sub-connection flow path 48, thereby effectively separating bubble mixed in the coolant into gas and liquid components.

A connection part of the reserve tank 46 is sufficient to be disposed on the downstream side of the coolant flow with respect to at least one of the temperature adjustment target devices 31, 32, 34, 36, and 37 and the heat exchangers 26, 33, and 35, and on the suction side of at least one of the first pump 23 and the second pump 24.

In this embodiment, the end of the main connection flow path 47 opposite to the reserve tank 46 is connected to the part of the first flow path 11 on the suction side of the first pump 23. On the other hand, the end of the sub-connection flow path 48 opposite to the reserve tank 46 is connected to the part of the first flow path 11 on the discharge side of the first pump 23.

Next, the details of the first and second switching valves 21 and 22 will be described. The first and second switching valves 21 and 22 have the same basic structure to each other. However, the first switching valve 21 differs from the second switching valve 22 in that an inlet for coolant and an outlet for fluid are reversed to each other.

The first switching valve 21 includes a first flow path 211 in communication with the first inlet 21a, and a second flow path 212 in communication with the second inlet 21b.

The first switching valve 21 includes four communication spaces 213 provided corresponding to the first outlet 21c, the second outlet 21d, the third outlet 21e, and the fourth outlet 21f. The respective communication spaces 213 allow the outlets 21c to 21f to communicate with the first flow path 211 and the second flow path 212.

A door type valve body 214 is disposed in each communication space 213. The valve body 214 is switched between a first position for fully opening the first flow path 211 while completely closing the second flow path 212, and a second position for completely closing the first flow path 211 while fully opening the second flow path 212. The valve body 214 is also operated to an intermediate position where an opening ratio of the first flow path 211 side to the second flow path 212 side is arbitrarily selectable.

Each valve body 214 is driven by an electric actuator (not shown). The number of electric actuators may be the same as that of the valve bodies 214, or smaller than that of the valve bodies 214. When the number of the electric actuators is smaller than that of the valve bodies 214, the electric actuators and the respective valve bodies 214 may be coupled together via a link mechanism or gear mechanism to communicatively drive the respective valve bodies 214.

Likewise, the second switching valve 22 also includes a first flow path 221 in communication with the first outlet 22a, and a second flow path 222 in communication with the second outlet 22b.

The second switching valve 22 has four communication spaces 223 corresponding to the respective first inlets 22c to 22f. The respective communication spaces 223 allow the first inlets 22c to 22f to communicate with the first flow path 221 and the second flow path 222.

A door type valve body 224 is disposed in each communication space 223. The valve body 224 is switched between a first position for fully opening the first flow path 221 while completely closing the second flow path 222, and a second position for completely closing the first flow path 221 while fully opening the second flow path 212. The valve body 224 is also operated to an intermediate position where an opening ratio of the first flow path 221 side to the second flow path 222 side is optionally selectable.

Each valve body 224 is driven by an electric actuator (not shown). The number of electric actuators may be the same as that of the valve bodies 224, or smaller than that of the valve bodies 224. When the number of the electric actuators is smaller than that of the valve bodies 224, the electric actuators and the respective valve bodies 224 may be coupled together via a link mechanism or gear mechanism to communicatively drive the respective valve bodies 224.

The first switching valve 21 may include a plurality of valve bodies. The second switching valve 22 may include a plurality of valve bodies. The valve body of the first switching valve 21 may be mechanically coupled to the valve body of the second switching valve 22. The valve body of the first switching valve 21 and the valve body of the second switching valve 22 may be integrally formed together.

Now, the leakage from the first and second switching valves 21 and 22 will be described below. For example, when there is a difference in pressure between the inlets 21a and 21b and the outlet 21c to 21f of the first switching valve 21, even though the valve body 214 is operated to the position for completely closing the first flow path 211 or the second flow path 212, the valve body 214 is slightly open according to the difference in pressure, causing the leakage of coolant. Hereinafter, such a leakage of the coolant is referred to as a "valve leakage", and the amount of leakage of the coolant is referred to as a "leaking amount".

The leaking amount changes depending on a seal structure of the valve body 214, and a holding force for holding the valve body 214 in the position. Thus, in order to decrease the leaking amount, a strong seal structure, and a powerful electric actuator are required. However, when adopting the strong seal structure and the powerful electric actuator, a slight valve leakage is actually inevitable because of an increase in volume or weight of the entire system.

Likewise, in the second switching valve 22, for example, when there is a difference in pressure between the outlets 22a and 22b and the inlet 22c to 22f of the second switching valve 22, even though the valve body 224 is operated to the position for completely closing the first flow path 221 or the second flow path 222, the valve body 214 is slightly open according to the difference in pressure, causing the valve leakage.

Figure 2:
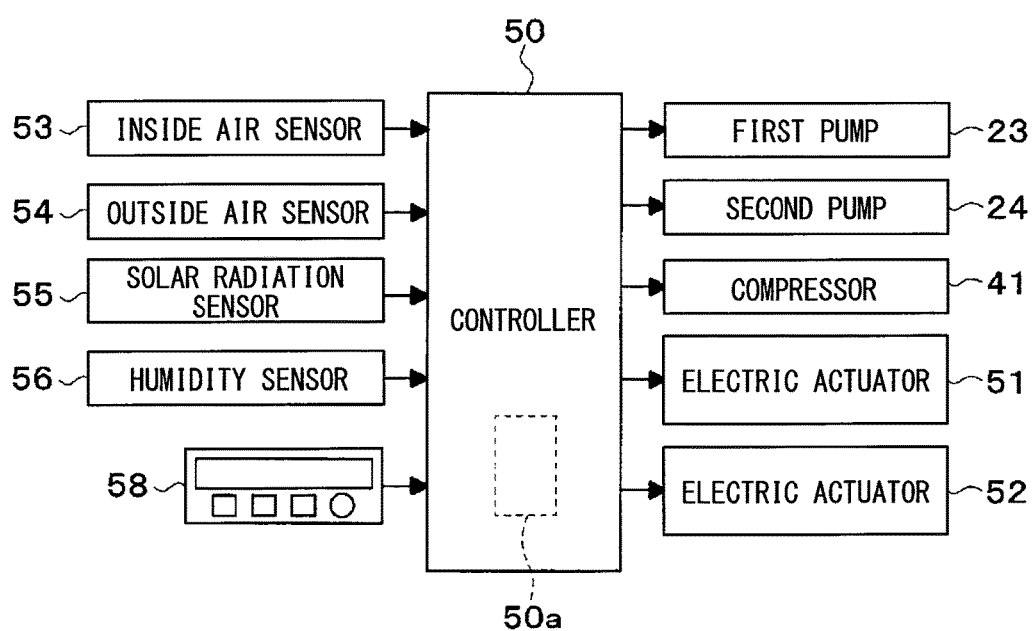
FIG. 2 is a block diagram showing an electric controller in the thermal management system for a vehicle in the first embodiment.

Now, an electric controller of the thermal management system 10 will be described with reference to FIG. 2. A controller 50 is comprised of a known microcomputer, including CPU, ROM, RAM, and the like, and a peripheral circuit thereof. The controller 50 is a control device for controlling the operations of the devices connected to the output side, including the first pump 23, the second pump 24, the compressor 41, an electric actuator 51 of the first switching valve 21, and an electric actuator 52 of the second switching valve 22, and the like by performing various kinds of computations and processing based on air conditioning control programs stored in the ROM.

The controller 50 is integrally structured with a control unit for controlling various control target devices connected to the output side of the controller. The control unit for controlling the operation of each of the control target devices includes a structure (hardware and software) adapted to control the operation of each of the control target devices.

In particular, a switching valve controller 50a has the structure (hardware and software) for controlling the operations of the electric actuator 51 of the first switching valve 21, and the electric actuator 52 of the second switching valve 22. Obviously, the switching valve controller 50a may be independently provided from the controller 50.

Detection signals from a group of sensors, including an inside air sensor 53, an outside air sensor 54, a solar radiation sensor 55, and a humidity sensor 56 and the like are input to the input side of the controller 50.

The inside air sensor 53 is a detector (inside air temperature detector) for detecting the temperature of inside air (or the temperature of the vehicle interior). The outside air sensor 54 is a detector (outside air temperature detector) for detecting the temperature of outside air. The solar radiation sensor 55 is a detector (solar radiation amount detector) for detecting the amount of solar radiation onto the vehicle interior. The humidity sensor 56 is a detector (humidity detector) for detecting the humidity of the vehicle interior.

An operation panel 58 is disposed near an instrument board at the front of the vehicle compartment. Operation signals are input from various types of air conditioning operation switches provided on the operation panel 58, to the input side of the controller 50. The various types of air conditioning operation switches provided in the operation panel 58 include an air conditioner switch, an automatic switch, an air volume setting switch, a vehicle-interior temperature setting switch, and the like.

The air conditioner switch is a switch for switching between operating and stopping (on and off) of air conditioning (cooling or heating). The automatic switch is a switch for setting or resetting automatic control of the air conditioning. The air volume setting switch is a switch for setting the volume of air from the interior blower. The vehicle-interior temperature setting switch serves as target temperature setting means for setting a target vehicle interior temperature set by a passenger's operation.

Now, the operation of the above-mentioned structure will be described. The controller 50 controls the operations of the electric actuator 51 of the first switching valve 21 and the electric actuator 52 of the second switching valve 22 to switch among various kinds of operation modes.

Specifically, the first flow path 11 and at least one of the third to sixth flow paths 13 to 16 form a first coolant circulation circuit (first heat medium circuit). The second flow path 12 and the remaining flow path among the third to sixth flow paths 13 to 16 form a second coolant circulation circuit (second heat medium circuit).

In each of the third to sixth flow paths 13 to 16, switching can be performed between the connection to the first coolant circulation circuit and the connection to the second coolant circulation circuit depending on the situation, thereby adjusting each temperature adjustment target device to an appropriate temperature according to the situation.

Alternatively, one or some of the third to sixth flow paths 13 to 16 may be connected to both the first coolant circulation circuit and the second coolant circulation circuit, thereby mixing and circulating the coolant in the first coolant circulation circuit and the coolant in the second coolant circulation circuit.

In the example shown in FIG. 1, the first switching valve 21 and the second switching valve 22 are switched such that the first, third, and fifth flow paths 11, 13, and 15 communicate with each other, and that the second, fourth, and sixth flow paths 12, 14, and 16 communicate with each other.

Thus, the first coolant circulation circuit (high-temperature coolant circuit) indicated by thick solid lines in FIG. 1 and the second coolant circulation circuit (low-temperature coolant circuit) indicated by thick alternate long and short dash lines in FIG. 1 are formed.

In the first coolant circulation circuit, the coolant circulates through among the radiator 26, inverter 31, electric motor 32 for traveling, condenser 35, and heater core 36. Thus, the waste heat from the inverter 31, electric motor 32 for traveling, and condenser 35 is dissipated from the radiator 26 and heater core 36, and thereby it can cool the inverter 31, electric motor 32 for traveling, and condenser 35.

In the second coolant circulation circuit, the coolant circulates through among the chiller 33, cooler core 34, and battery 37. Thus, the coolant cooled by the chiller 33 to a temperature lower than the outside air temperature can cool the cooler core 34 and the battery 37. By cooling the cooler core 34, the vehicle interior can be cooled.

Further, in the example shown in FIG. 1, the valve body 224 corresponding to the fourth inlet 22*f* is slightly open on the first flow path 211 side such that the first coolant circulation circuit communicates with the second coolant circulation circuit in the second switching valve 22. As a result, a communication flow path R for communication between the first coolant circulation circuit and the second coolant circulation circuit is formed within the second switching valve 22.

At this time, the opening degree of the valve body 224 corresponding to the fourth inlet 22*f* is adjusted such that the flow rate of coolant in the communication flow path R is more than each of the leakage amount from the first switching valve 21 and the leakage amount from the second switching valve 22.

The reserve tank 46 is connected to the first flow path 11 (first circuit formation flow path) forming the first coolant circulation circuit. When the volume of the coolant expands or contracts together with the changes in temperature of the coolant in the first coolant circulation circuit, thereby changing the pressure of the first coolant circulation circuit, the first coolant circulation circuit can exchange the coolant with the reserve tank 46. Thus, the pressure of the first coolant circulation circuit can be maintained within an appropriate range.

The second coolant circulation circuit is connected to the first coolant circulation circuit via the communication flow path R. When the volume of the coolant expands or contracts together with the changes in temperature of the coolant in the second coolant circulation circuit, thereby changing the pressure of the second coolant circulation circuit, the second coolant circulation circuit can exchange the coolant with the reserve tank 46. Thus, the pressure of the second coolant circulation circuit can be maintained within an appropriate range.

The reserve tank 46 is connected to the first flow path 11, and not connected to the second flow path 12. In other words, the reserve tank 46 is connected to only one flow path 11 of the first to sixth flow paths 11 to 16.

Thus, the coolant is not exchanged between the first coolant circulation circuit and the second coolant circulation circuit via the reserve tank 46. As a result, when there is a difference in output between the first pump 23 and the second pump 24, the waste of the pump power due to the local formation of the loop circuit and the loss of heat due to the mixing of the coolant having a different temperature zone can be prevented.

The reserve tank 46 is connected to the downstream side of the coolant flow with respect to the radiator 26, and to the suction side of the first pump 23 in the first coolant circulation circuit, so that the pressure on the suction side of the first pump 23 becomes substantially the atmospheric pressure. This embodiment can prevent an increase in pressure loss due to the occurrence of cavitation and the breakdown of a coolant hose that might be caused when the pressure on the suction side of the first pump 23 becomes a negative pressure.

The communication flow path R for communication between the first and second coolant circulation circuits is formed in the second switching valve 22 positioned on the downstream side (pump suction side). The phrase "the second switching valve 22 is positioned on the downstream side (pump suction side)" as used herein means that the second switching valve 22 is positioned on the downstream side of the coolant flow with respect to at least one of the temperature adjustment target devices 31, 32, 34, 36, and 37 and the heat exchangers 26, 33, and 35 which are disposed in the first to sixth flow paths 11 to 16, as well as on the suction side of the first and second pumps 23 and 24. In the example shown in FIG. 1, the second switching valve 22 is positioned on the downstream side of the coolant flow with respect to the battery 37, as well as on the suction side of the first and second pumps 23 and 24.

In this way, because the communication flow path R is formed in the second switching valve 22 positioned on the downstream side (pump suction side), it can prevent a part of the second coolant circulation circuit from having a negative pressure in the operation state where the lifting height of the first pump 23 is lower than that of the second pump 24. The reason for this will be described below.

For better understanding, in the description below, the operating state is assumed in which the first pump 23 is stopped and the second pump 24 is operating with a predetermined range of lift.

When the first pump 23 is stopped, the air-release reserve tank 46 is connected to the first coolant circulation circuit, whereby any part of the first coolant circulation circuit has substantially the atmospheric pressure. At this time, the first pump 23 and the second pump 24 differ from each other in a range of lift, thereby generating a difference in pressure between the first and second coolant circulation circuits. Thus, the first switching valve 21 and the second switching valve 22 generate the valve leakage described above.

When the valve leakage occurs in the first and second switching valves 21 and 22, the coolant is transferred between the first and second coolant circulation circuits in the respective first and second switching valve 21 and 22 in such a direction as to equalize the pressure or the like between these circulation circuits.

Suppose that when the communication flow path R is not formed and the amount of leakage on the upstream side (pump discharge side) is more than that of leakage on the downstream side (pump suction side), the pressures of the first and second coolant circulation circuits are equalized in the first switching valve 21 from which an amount of leakage is the most. As mentioned above, since the air-release reserve tank 46 is connected to the first coolant circulation circuit, when the first pump 23 is stopped, any part of the first coolant circulation circuit has substantially the atmospheric pressure. Regarding the pressure of the second coolant circulation circuit, the pressure of the first switching valve 21 becomes substantially the atmospheric pressure, and thus the pressure on the discharge side of the second pump 24 also becomes substantially the atmospheric pressure.

In this case, the pressure on the suction side of the second pump 24 becomes a pressure obtained by subtracting a pressure corresponding to the lifting height of the pump from the pressure on the discharge side of the second pump 24. As a result, the pressure on the suction side of the second pump 24 becomes a negative pressure.

In this way, in the case where the communication flow path R is not formed, when there is a difference in lifting height between the first pump 23 and the second pump 24, the pressure on the suction side of the second pump 24 becomes a negative pressure, so that it can cause the cavitation.

From this point, since in the first embodiment, the communication flow path R is formed in the second switching valve 22 positioned on the downstream side, the amount of transfer of the coolant between the first and second coolant circulation circuits becomes the most in the communication flow path R.

Thus, the pressures in the first and second coolant circulation circuits are equalized in the communication flow path R where the amount of transfer of the coolant becomes most. As a result, as to the pressure of the second coolant circulation circuit, the pressure at the second switching valve 22 becomes substantially atmospheric pressure, and thus the pressure on the suction side of the second pump 24 becomes substantially atmospheric pressure. This arrangement can avoid the pressure on the suction side of the second pump 24 from being a negative pressure.

The valve leakage properties of the first and second switching valves 21 and 22 fluctuate depending on production tolerance (accumulation of size variation, and assembly variation). Thus, upon the mass production of the thermal management system 10 for a vehicle, it is supposed that in some thermal management systems, the amount of leakage from the first switching valve 21 is much more than that from the second switching valve 22, regardless of the difference in pressure between the first and second coolant circulation circuits.

(Second Embodiment)

Figure 3:
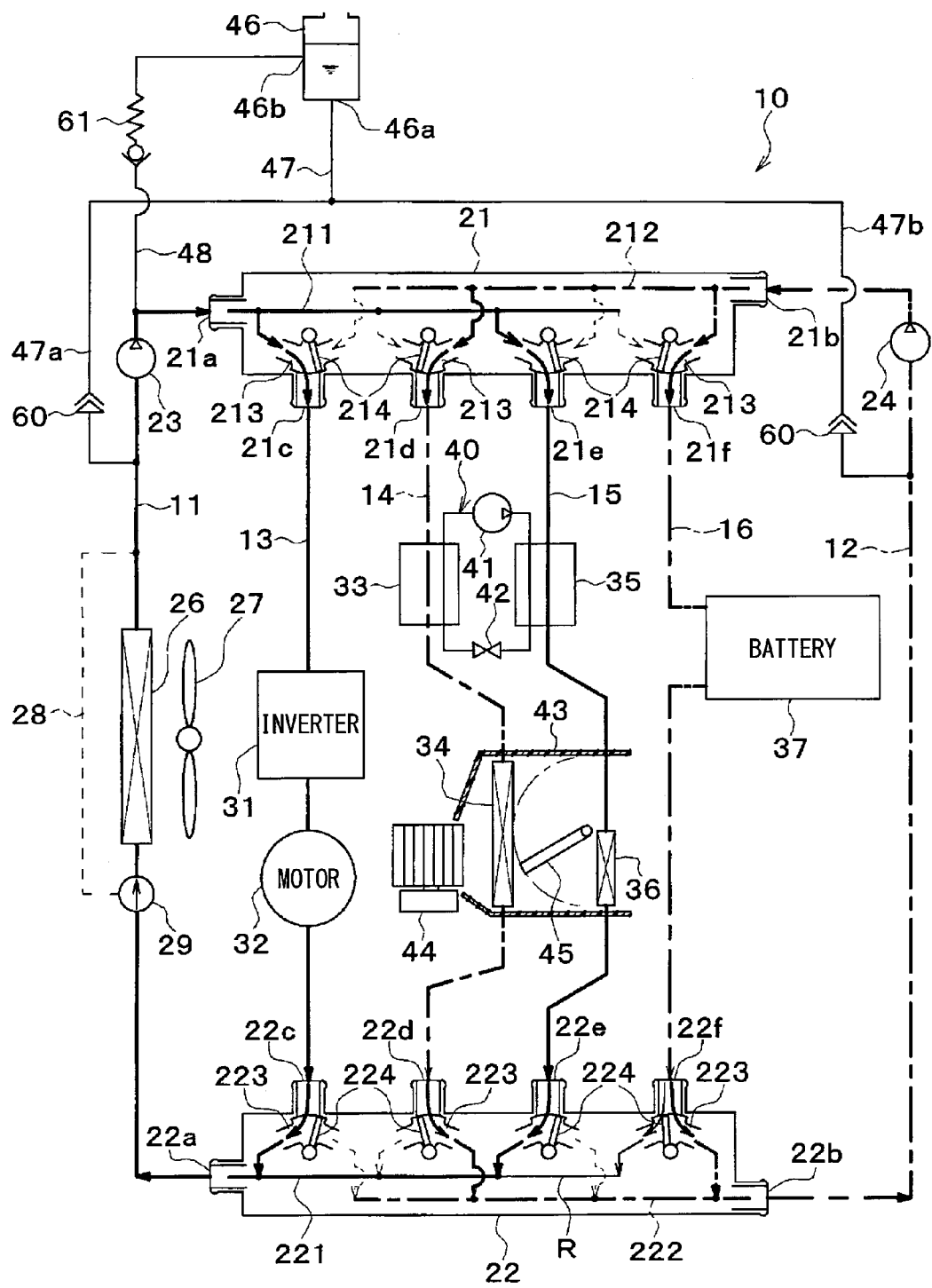
FIG. 3 is an entire configuration diagram of a thermal management system for a vehicle according to a second embodiment of the invention.

Although in the first embodiment, the air-release reserve tank 46 is connected only to the first flow path 11, in a second embodiment of the invention, as shown in FIG. 3, the air-release reserve tank 46 is connected not only to the first flow path 11, but also to the second flow path 12.

The connection between the reserve tank 46 and the second flow path 12 is performed via the main connection flow path 47. The main connection flow path 47 is branched into two parts on the side opposite to the reserve tank 46, and the parts are connected to the first and second flow paths 11 and 12, respectively. The two parts 47a and 47b branched from the main connection flow path 47 are respectively provided with negative pressure valves 60. The sub-connection flow path 48 is provided with a pressurizing valve 61.

The negative pressure valve 60 operates to close when the internal pressure of the flow path is equal to or higher than atmospheric pressure, and to open when the internal pressure of the flow path is lower than the atmospheric pressure. Thus, when the internal pressure of the first coolant circulation circuit is less than the atmospheric pressure, the coolant in the reserve tank 46 is supplied to the first coolant circulation circuit. When the internal pressure of the second coolant circulation circuit is less than the atmospheric pressure, the coolant in the reserve tank 46 is supplied to the second coolant circulation circuit.

The pressurizing valve 61 is closed when the internal pressure of the flow path is lower than a preset pressure (108 kPa in this example) which is higher than the atmospheric pressure, and is open when the internal pressure of the flow path is equal to or higher than the preset pressure. Thus, when the internal pressure of the first coolant circulation circuit is equal to or higher than the preset pressure, the coolant in the first coolant circulation circuit is discharged to the reserve tank 46.

That is, the negative pressure valve 60 and the pressurizing valve 61 each configure a pressure adjustment valve that is adapted to be open when the internal pressure of the flow path exceeds a predetermined range.

The end of the main connection flow path 47 opposite to the reserve tank 46 is connected to the part on the suction side of the first pump 23 in the first flow path 11 as well as the part on the suction side of the second pump 24 in the second flow path 12.

Like the above-mentioned first embodiment, also in the second embodiment, the first switching valve 21 and the second switching valve 22 are switched to perform switching among various operation modes. In an example shown in FIG. 3, like the example shown in FIG. 1, the first, third, and fifth flow paths 11, 13, and 15 communicate with each other to thereby form the first coolant circulation circuit indicated by thick solid lines of FIG. 3, whereas the second, fourth, and sixth flow paths 12, 14, and 16 communicate with each other to thereby form the second coolant circulation circuit indicated by thick alternate long and short dash lines of FIG. 3.

Further, in the example shown in FIG. 3, like the example shown in FIG. 1, the valve body 224 corresponding to the fourth inlet 22f is slightly open on the first flow path 211 side such that the first coolant circulation circuit communicates with the second coolant circulation circuit in the second switching valve 22. As a result, a communication flow path R for communication between the first coolant circulation circuit and the second coolant circulation circuit is formed within the second switching valve 22.

At this time, the opening degree of the valve body 224 corresponding to the fourth inlet 22f is adjusted such that the flow rate of coolant in the communication flow path R is more than each of the leakage amount from the first switching valve 21 and the leakage amount from the second switching valve 22.

The reserve tank 46 is connected to the first flow path 11 (first circuit formation flow path) via the negative pressure valve 60. When the pressure of the first coolant circulation circuit is lower than a first predetermined pressure (atmospheric pressure in this example) due to the contraction of the volume of the coolant together with a decrease in temperature of the coolant in the first coolant circulation circuit, the coolant can be supplied from the reserve tank 46 into the first coolant circulation circuit.

The reserve tank 46 is connected to the first flow path 11 (first circuit formation flow path) via the pressurizing valve 61. The coolant in the first coolant circulation circuit can be discharged into the reserve tank 46 when the pressure of the first coolant circulation circuit is equal to or higher than a second predetermined pressure (which is a preset pressure higher than the atmospheric pressure in this example) due to the expansion of the volume of the coolant together with an increase in temperature of the coolant in the first coolant circulation. As mentioned above, the pressure of the first coolant circulation circuit can be maintained within an appropriate range.

The reserve tank 46 is connected to the second flow path 12 (second circuit formation flow path) for forming the second coolant circulation circuit via the negative pressure valve 60. When the pressure of the second coolant circulation circuit is lower than the first predetermined pressure (the atmospheric pressure in this example), the coolant can be supplied from the reserve tank 46 into the second coolant circulation circuit.

The reserve tank 46 is connected to the downstream side of the coolant flow with respect to the radiator 26, and to the suction side of the first pump 23 in the first coolant circulation circuit, so that the pressure on the suction side of the first pump 23 becomes substantially the atmospheric pressure. This embodiment can prevent an increase in pressure loss due to the occurrence of cavitation and the breakdown of a coolant hose that might be caused when the pressure on the suction side of the first pump 23 becomes a negative pressure.

The reserve tank 46 is connected to the downstream side of the coolant flow with respect to the cooler core 34 and the battery 37, and to the suction side of the second pump 24 in the second coolant circulation circuit, so that the pressure on the suction side of the second pump 24 becomes substantially the atmospheric pressure. This embodiment can prevent an increase in pressure loss due to the occurrence of cavitation and the breakdown of a coolant hose that might be caused when the pressure on the suction side of the second pump 24 becomes a negative pressure.

The second coolant circulation circuit communicates with the first coolant circulation circuit via the communication flow path R. Thus, the pressure of the first coolant circulation circuit is also increased when the pressure of the second coolant circulation circuit is increased due to the increase in volume of the coolant together with the increase in temperature of the coolant of the second coolant circulation circuit. As a result, when the pressure of the first coolant circulation circuit is equal to or higher than the second predetermined pressure (preset pressure higher than the atmospheric pressure in this example), the coolant in the first coolant circulation circuit is discharged to the reserve tank 46. As mentioned above, the pressure of the second coolant circulation circuit can be maintained within an appropriate range.

The reserve tank 46 is connected to the first flow path 11 via the negative pressure valve 60 and the pressurizing valve 61. When the pressure of the first coolant circulation circuit is maintained within an appropriate range, the coolant cannot be transferred between the first and second coolant circulation circuits via the reserve tank 46. As a result, when there is a difference in output between the first pump 23 and the second pump 24, the waste of the pump power due to the local formation of the loop circuit can be prevented.

Like the above-mentioned first embodiment, because the communication flow path R is formed in the second switching valve 22 positioned on the downstream side, it can prevent a part of the second coolant circulation circuit from having a negative pressure in the operation state where the lifting height of the first pump 23 is lower than that of the second pump 24.

In the second embodiment, when the internal pressure of the first flow path 11 exceeds a predetermined range, the negative pressure valve 60 or pressurizing valve 61 is closed, so that the pressure of the first coolant circulation circuit can be maintained within a predetermined range. When the internal pressure of the second flow path 12 exceeds a predetermined range, the negative pressure valve 60 or pressurizing valve 61 is closed, so that the pressure of the second coolant circulation circuit can be maintained within a predetermined range. When the internal pressure of the reserve tank 46 exceeds a predetermined range, the negative pressure valve 60 or pressurizing valve 61 is closed, so that the internal pressure of the reserve tank 46 can be maintained within the predetermined range.

(Third Embodiment)

Figure 4:
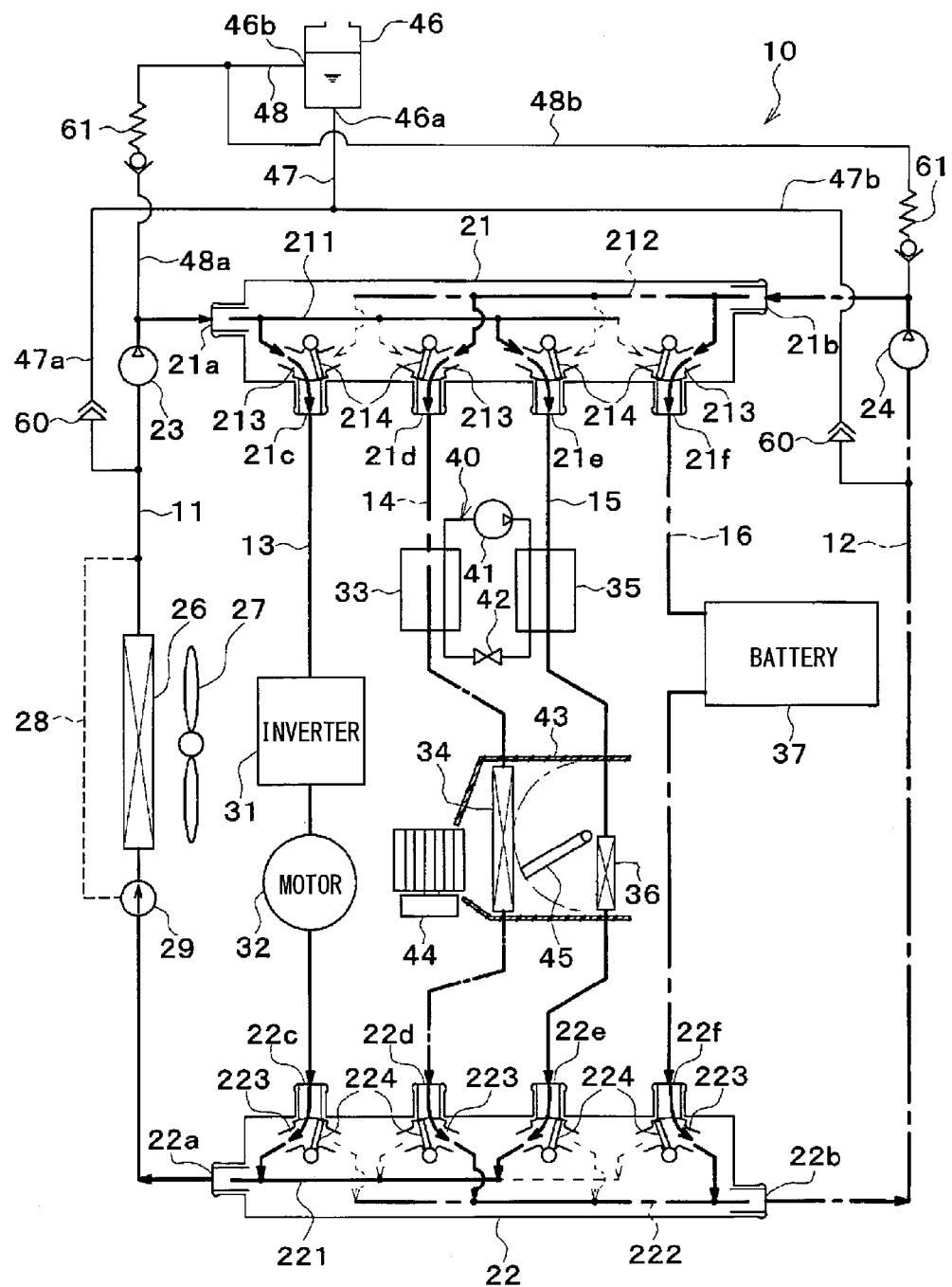
FIG. 4 is an entire configuration diagram of a thermal management system for a vehicle according to a third embodiment of the invention.

Although in the second embodiment, the sub-connection flow path 48 is connected only to the first flow path 11, in a third embodiment of the invention, as shown in FIG. 4, the sub-connection flow path 48 is connected not only to the first flow path 11, but also to the second flow path 12.

The sub-connection flow path 48 is branched into two parts on the side opposite to the reserve tank 46, and the parts are connected to the first and second flow paths 11 and 12, respectively. The two branched parts 48a and 48b of the sub-connection flow path 48 are respectively provided with the pressurizing valves 61.

The end of the main connection flow path 47 opposite to the reserve tank 46 is connected to the part on the suction side of the first pump 23 in the first flow path 11 as well as the part on the suction side of the second pump 24 in the second flow path 12.

The end of the sub-connection flow path 48 opposite to the reserve tank 46 is connected to the part of the first pump arrangement flow path 11 on the discharge side of the first pump 23 as well as the part of the second pump arrangement flow path 12 on the discharge side of the second pump 24.

Like the above-mentioned first embodiment, the first switching valve 21 and the second switching valve 22 are switched to perform switching among various operation modes. In the example shown in FIG. 4, like the example shown in FIG. 1, the first, third, and fifth flow paths 11, 13, and 15 communicate with each other to thereby form the first coolant circulation circuit indicated by thick solid lines of FIG. 4, whereas the second, fourth, and sixth flow paths 12, 14, and 16 communicate with each other to thereby form the second coolant circulation circuit indicated by thick alternate long and short dash lines of FIG. 4.

As shown in FIG. 4, in the third embodiment, unlike the above-mentioned second embodiment, in the downstream side second switching valve 22, the valve body 224 corresponding to the fourth inlet 22f may completely close the first flow path 211 side so as not to form the communication flow path R for communication between the first and second coolant circulation circuits.

Like the second embodiment, because the reserve tank 46 is connected to the first flow path 11 (first circuit formation flow path) via the negative pressure valve 60 and the pressurizing valve 61, it can maintain the pressure of the first coolant circulation circuit within an appropriate range.

Further, because the reserve tank 46 is connected to the second flow path 12 (second circuit formation flow path) via the negative pressure valve 60 and the pressurizing valve 60, it can also maintain the pressure of the second coolant circulation circuit within an appropriate range.

The reserve tank 46 is connected to the first flow path 11 and the second flow path 12 via the negative pressure valve 60 and the pressurizing valve 61. Thus, when at least one of the pressure of the first coolant circulation circuit and the pressure of the second coolant circulation circuit is maintained within an appropriate range, the coolant cannot be transferred between the first and second coolant circulation circuits via the reserve tank 46. As a result, when there is a difference in output between the first pump 23 and the second pump 24, the waste of the pump power due to the local formation of the loop circuit and the loss of heat due to the mixing of the coolant having a different temperature zone can be prevented.

(Fourth Embodiment)

Figure 5:
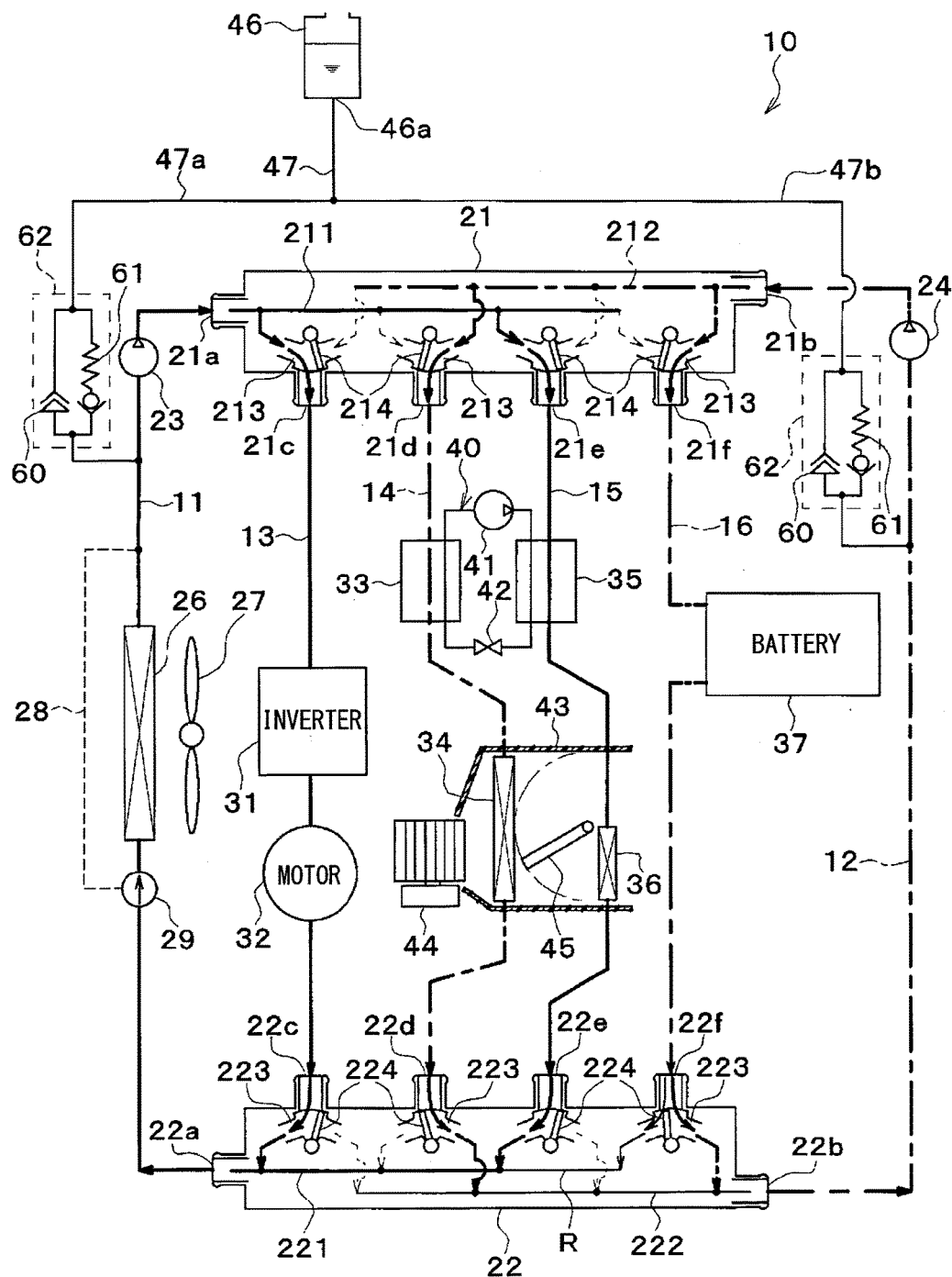
FIG. 5 is an entire configuration diagram of a thermal management system for a vehicle according to a fourth embodiment of the invention.

Although in the above-mentioned third embodiment, the negative pressure valve 60 is disposed in the main connection flow path 47, and the pressurizing valve 61 is disposed in the sub-connection flow path 48, in a fourth embodiment of the invention, as shown in FIG. 5, the negative pressure valve 60 and the pressurizing valve 61 are integrally disposed in the main connection flow path 47.

The negative pressure valve 60 and the pressurizing valve 61 are respectively provided in each of the two parts 47a and 47b into which the main connection flow path 47 is branched. In the fourth embodiment of the invention, the sub-inflow-outflow port 46b of the reserve tank 46 and the sub-connection flow path 48 are not provided.

Figure 6:
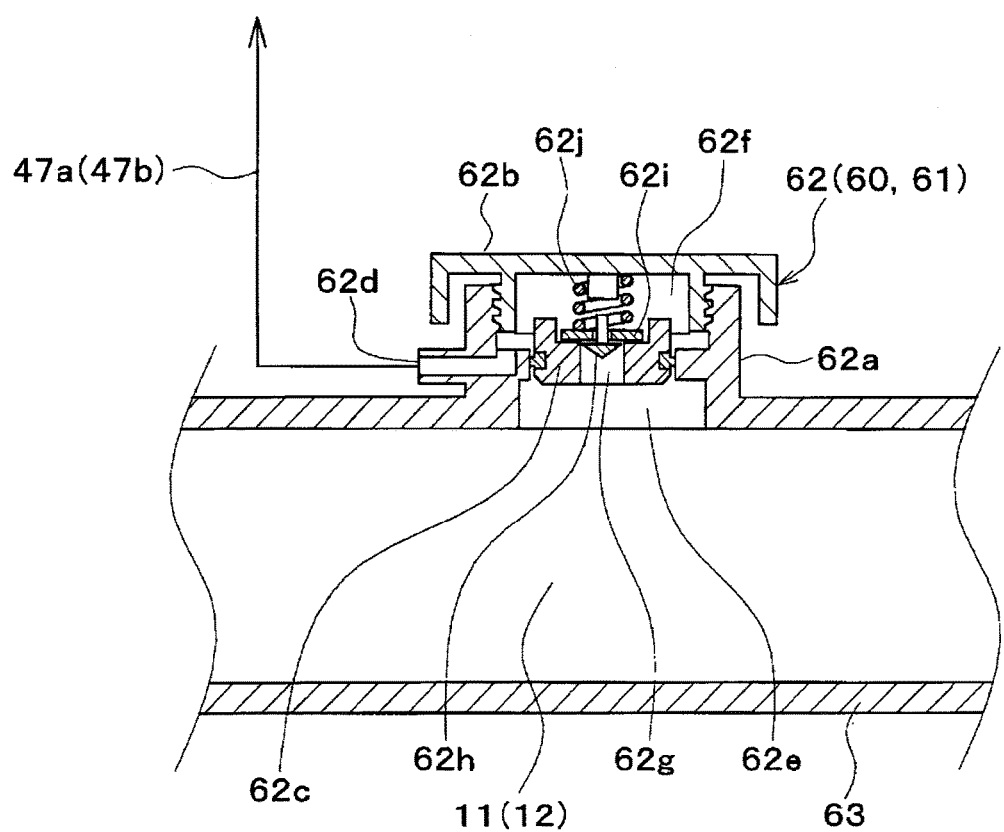
FIG. 6 is a cross-sectional view showing a negative pressure valve, a pressurizing valve, and a cap structure in the fourth embodiment.

As shown in FIG. 6, the negative pressure valve 60 and the pressurizing valve 61 are disposed in a cap structural portion 62 provided in each of the first and second flow paths 11 and 12. FIG. 6 illustrates the cap structural portion 62 provided in the first flow path 11.

The structure of the cap structural portion 62 provided in the second flow path 12 is the same as that of the cap structural portion 62 provided in the first flow path 11. Thus, the components corresponding to the cap structural portion 62 provided in the second flow path 12 are denoted by reference characters within parentheses, and the description of the cap structural portion 62 provided in the second flow path 12 will be omitted.

The cap structural portion 62 includes a cylindrical portion 62a formed in a pipe member 63 constituting the first flow path 11 (second flow path 12), and a cap member 62b fitted into the cylindrical portion 62a. The internal space of the cylindrical portion 62a communicates with the first flow path 11 (second flow path 12). The cylindrical portion 62a is provided with a relief port 62d to which the main connection flow path 47a (47b) is connected.

The internal space of the cylindrical portion 62a is partitioned by a partition member 62c into a space 62e on a side of the first flow path 11 (second flow path 12) and a space 62f on a side of the cap member 62b. The space 62e on the cap member 62b side communicates with the main connection flow paths 47a and 47b via the relief port 62d.

The partition member 62c is provided with a valve port 62g for communication between both spaces 62e and 62f. The valve port 62g is opened and closed by a valve body 62h for a negative pressure valve and a valve body 62i for a pressurizing valve which are attached to the cap member 62b.

The valve body 62i for a pressurizing valve receives an urging force by a spring member 62j attached to the cap member 62b. The urging force of the spring member 62j causes the cap member 62b to close the valve port 62g until a preset pressure is exceeded.

In the fourth embodiment of the invention, because the negative pressure valve 60 and the pressurizing valve 61 are disposed in the cap structural portion 62, it can simplify the structure of pipe connection. Note that the cap structural portion 62 is also used as an inlet for charging the coolant thereinto.

(Fifth Embodiment)

Figure 7:
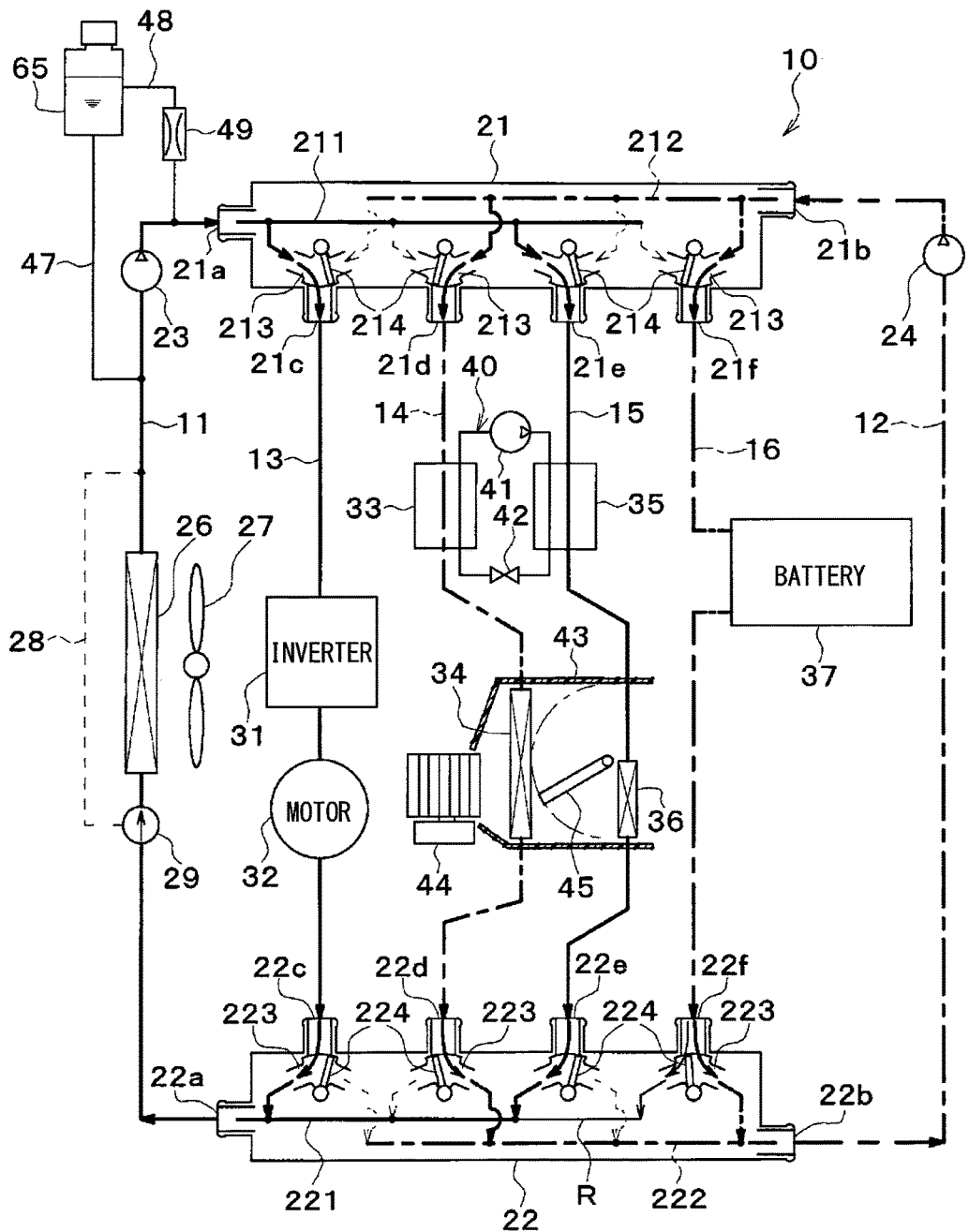
FIG. 7 is an entire configuration diagram of a thermal management system for a vehicle according to a fifth embodiment of the invention.

Although in the first embodiment, the air-release reserve tank 46 is disposed, in a fifth embodiment of the invention, as shown in FIG. 7, a sealed type reserve tank 65 is disposed in place of the air-release reserve tank 46.

The reserve tank 65 is a sealed type container (heat medium storage portion) for storing the coolant therein. Excessive coolant is stored in the reserve tank 65, and thereby it can suppress the decrease in liquid amount of the coolant circulating through the respective flow paths.

By using the sealed type reserve tank 65, fluctuations in liquid surface within the reserve tank 65 can be efficiently kept minimum even in an operation state where the range of lift of the first pump 23 is drastically different from that of the second pump 24.

The reserve tank 65 has a function of separating the air bubbles contained in the coolant, into gas and liquid components. The reserve tank 65 holds the pressure of the coolant at the appropriate pressure against abnormal increase and decrease in pressure due to the expansion and contraction caused by the change in temperature of the coolant.

Figure 8:
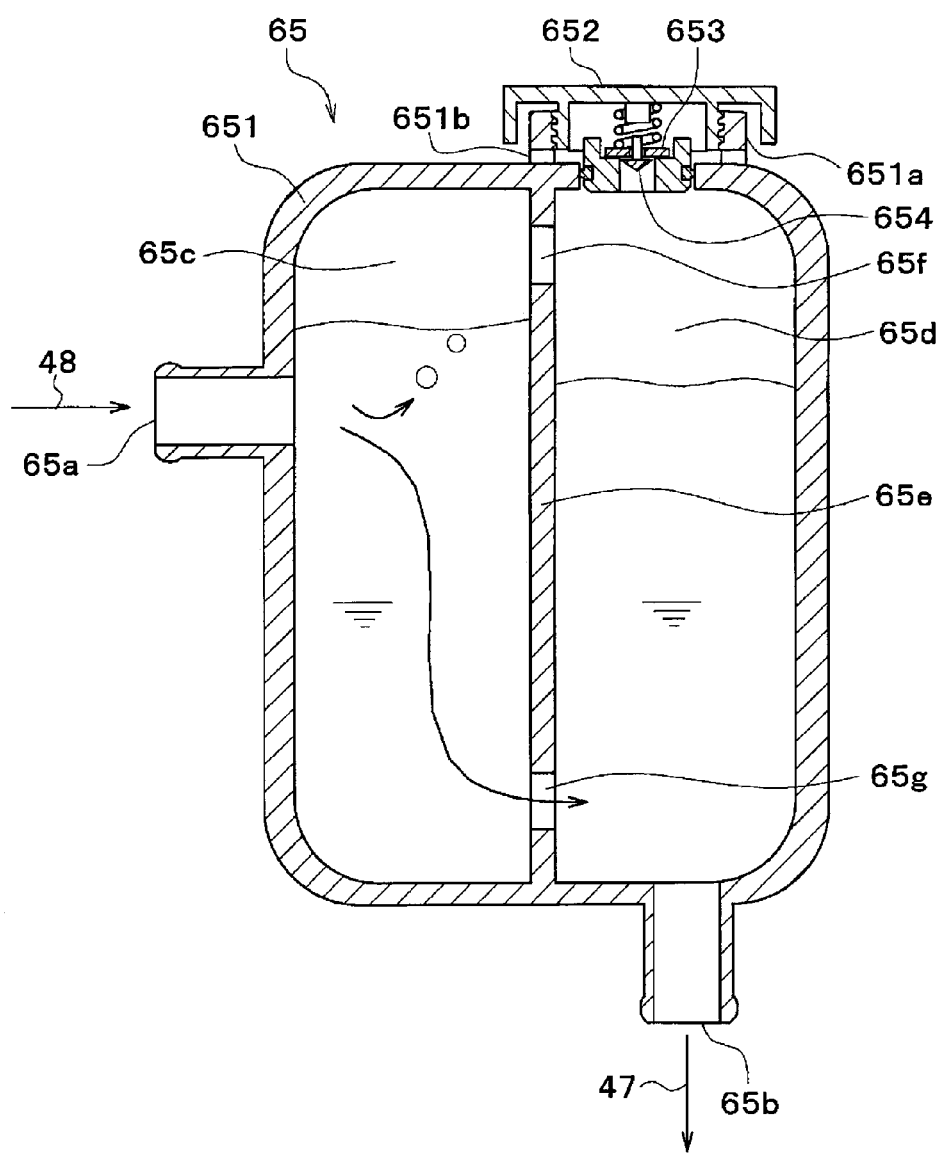
FIG. 8 is a cross-sectional view of a reserve tank in the fifth embodiment.

As shown in FIG. 8, the reserve tank 65 has a main body 651 with an opening formed therein, and a lid member 652 for covering the opening of the main body 651. The lid member 652 is fitted into a cylindrical portion 651a formed around the opening of the main portion 651. The cylindrical portion 651a and lid member 652 are provided with a negative pressure valve 653 and a pressurizing valve 654.

The negative pressure valve 653 is open when an inner pressure of the tank is equal to or less than atmospheric pressure. The pressurizing valve 654 is open when an inner pressure of the tank exceeds a preset pressure that is equal to or higher than the atmospheric pressure. Thus, the inner pressure of the tank can be maintained to the atmospheric pressure or more, and to a preset pressure or less.

That is, the negative pressure valve 653 and the pressurizing valve 654 each configure a pressure adjustment valve that is adapted to be open when the internal pressure of the reserve tank 65 exceeds a predetermined range.

The cylindrical portion 651a, the lid member 652, the negative pressure valve 653, and the pressurizing valve 654 have the same structure as that of the cap structural portion 62 in the above-mentioned fourth embodiment. The relief port 651b formed in the cylindrical portion 651a is opened to the outside air.

A coolant inlet 65a of the reserve tank 65 is formed above the main body 651. The coolant inlet 65a is connected to the sub-connection flow path 48. A coolant outlet 65b of the reserve tank 65 is formed under the main body 651. The coolant outlet 65b is connected to the main connection flow path 47.

A partition wall 65e is formed inside the main body 651 of the reserve tank 65 so as to partition the internal space of the tank into an inlet side space 65c and an outlet side space 65d. The partition wall 65e can improve the gas-liquid separation function of the reserve tank 65. In the example shown in FIG. 8, the opening covered by the lid member 652 of the main body 651 is formed on a side of the outlet side space 65d.

Communication holes 65f and 65g for communication between the inlet side space 65c and the outlet side space 65d are formed in a lower part and an upper part of the partition wall 65e, respectively. The communication hole 65f formed in the lower part of the partition wall 65e is a hole for allowing the coolant to flow therethrough from the inlet side space 65c to the outlet side space 65d. The communication hole 65g formed in the upper part of the partition wall 65e is a hole for allowing the air to flow therethrough between the inlet side space 65c and the outlet side space 65d.

A connection part of the reserve tank 65 is sufficient to be disposed on the downstream side of the coolant flow with respect to at least one of the temperature adjustment target devices 31, 32, 34, 36, and 37 and the heat exchangers 26, 33, and 35, and on the suction side of at least one of the first pump 23 and the second pump 24.

Like the above-mentioned first embodiment, the first switching valve 21 and the second switching valve 22 are switched to perform switching among various operation modes. In the example shown in FIG. 7, like the example shown in FIG. 1, the first, third, and fifth flow paths 11, 13, and 15 communicate with each other to thereby form the first coolant circulation circuit indicated by thick solid lines of FIG. 7, whereas the second, fourth, and sixth flow paths 12, 14, and 16 communicate with each other to thereby form the second coolant circulation circuit indicated by thick alternate long and short dash lines of FIG. 7.

Further, in the example shown in FIG. 7, like the example shown in FIG. 1, the valve body 224 corresponding to the fourth inlet 22f is slightly open on the first flow path 211 side such that the first coolant circulation circuit communicates with the second coolant circulation circuit in the second switching valve 22 positioned on the downstream side. As a result, a communication flow path R for communication between the first coolant circulation circuit and the second coolant circulation circuit is formed within the second switching valve 22.

At this time, the opening degree of the valve body 224 corresponding to the fourth inlet 22f is adjusted such that the flow rate of coolant in the communication flow path R is more than each of the leakage amount from the first switching valve 21 and the leakage amount from the second switching valve 22.

In the fifth embodiment, the reserve tank 65 whose internal pressure is maintained within the predetermined range is connected to the first flow path 11. When the volume of the coolant expands or contracts together with the changes in temperature of the coolant in the first coolant circulation circuit, thereby changing the pressure of the first coolant circulation circuit, the first coolant circulation circuit can exchange the coolant with the reserve tank 65. Thus, the pressure of the first coolant circulation circuit can be maintained within an appropriate range.

The second coolant circulation circuit is connected to the first coolant circulation circuit via the communication flow path R. When the volume of the coolant expands or contracts together with the changes in temperature of the coolant in the second coolant circulation circuit, thereby changing the pressure of the second coolant circulation circuit, the second coolant circulation circuit can exchange the coolant with the reserve tank 65. Thus, the pressure of the second coolant circulation circuit can be maintained within an appropriate range.

The reserve tank 65 is connected to the first flow path 11 but not connected to the second flow path 12, and thereby it prevents the coolant from being transferred between the first and second coolant circulation circuits via the reserve tank 65. As a result, when there is a difference in output between the first pump 23 and the second pump 24, the waste of the pump power due to the formation of the local loop circuit can be prevented.

Like the above-mentioned first embodiment, because the communication flow path R for communication between the first and second coolant circulation circuits is formed in the second switching valve 22, it can prevent a part of the second coolant circulation circuit from having a negative pressure in the operation state where the range of lift of the first pump 23 is lower than that of the second pump 24.

(Sixth Embodiment)

Figure 9:
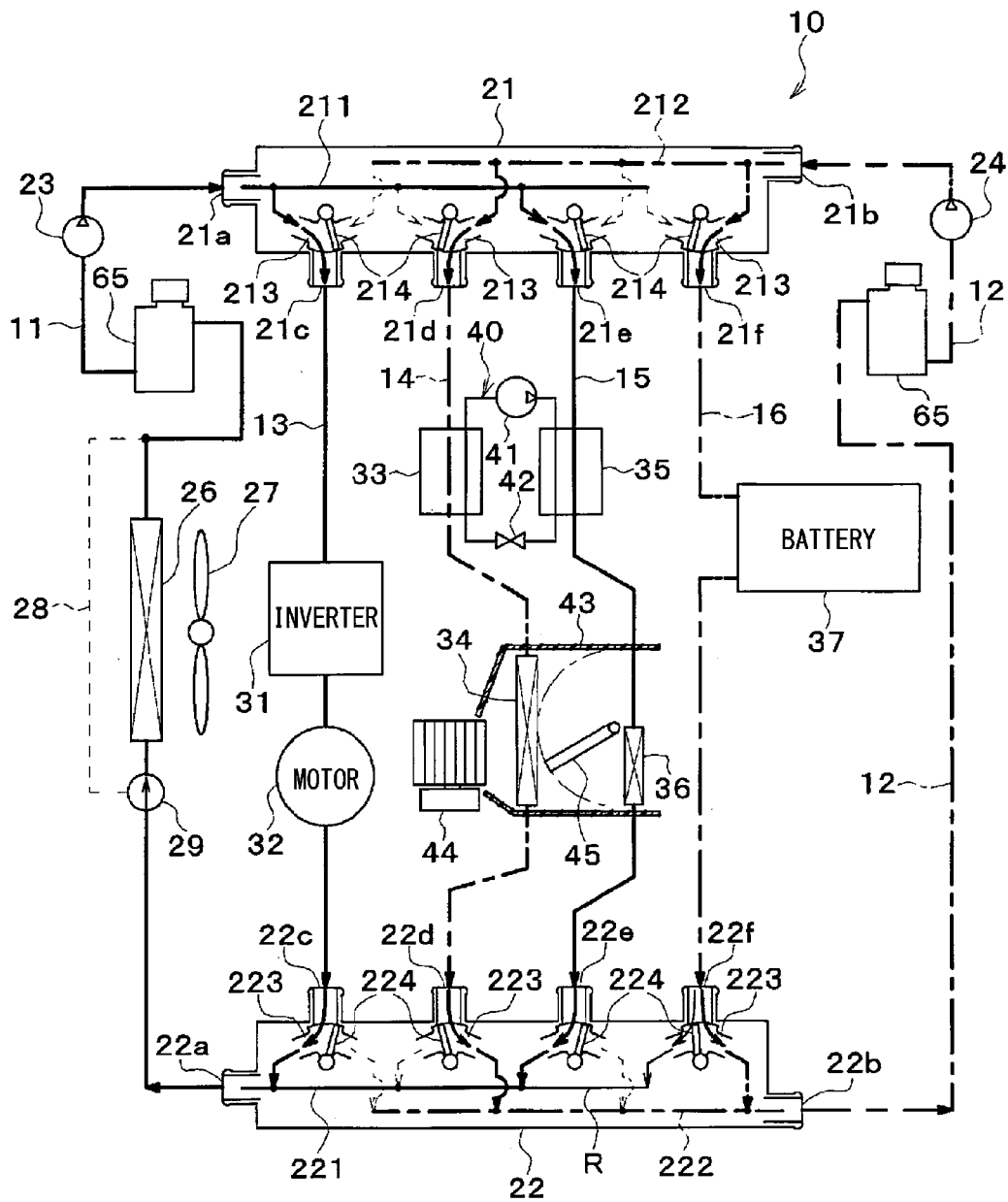
FIG. 9 is an entire configuration diagram of a thermal management system for a vehicle according to a sixth embodiment of the invention.

Although in the above-mentioned fifth embodiment, only one sealed reserve tank 65 is disposed, in a sixth embodiment of the invention, as shown in FIG. 9, two sealed reserve tanks 65 are disposed (for convenience, hereinafter referred to as a "first reserve tank 65" and a "second reserve tank 65").

The first reserve tank 65 is disposed on the suction side of the first pump 23 in the first flow path 11. The second reserve tank 65 is disposed on the suction side of the second pump 24 in the second flow path 12. In other words, the first reserve tank 65 is directly connected to the first flow path 11 and the second reserve tank 65 is directly connected to the second flow path 12.

Each of the first and second reserve tank 65 is provided with the negative pressure valve 653 and the pressuring valve 654 which are the same as those in the above-mentioned fifth embodiment shown in FIG. 8. The negative pressure valve 653 and pressurizing valve 654 provided in the first reserve tank 65 are opened when the internal pressure of the first reserve tank 65 exceeds a first predetermined range defined for the first reserve tank 65. The negative pressure valve 653 and pressurizing valve 654 provided in the second reserve tank 65 are opened when the internal pressure of the second reserve tank 65 exceeds a second predetermined range defined for the second reserve tank 65.

Like the above-mentioned first embodiment, the first switching valve 21 and the second switching valve 22 are switched to perform switching among various operation modes. In the example shown in FIG. 9, like the example shown in FIG. 1, the first, third, and fifth flow paths 11, 13, and 15 communicate with each other to thereby form the first coolant circulation circuit indicated by thick solid lines of FIG. 9, whereas the second, fourth, and sixth flow paths 12, 14, and 16 communicate with each other to thereby form the second coolant circulation circuit indicated by thick alternate long and short dash lines of FIG. 9.

Further, in the example shown in FIG. 9, like the example shown in FIG. 1, the valve body 224 corresponding to the fourth inlet 22*f* is open in a small amount on the first flow path 211 side such that the first coolant circulation circuit communicates with the second coolant circulation circuit in the second switching valve 22 on the downstream side. As a result, the communication flow path R for communication between the first coolant circulation circuit and the second coolant circulation circuit is formed as indicated by thick alternate long and two short dashes lines of FIG. 9.

At this time, the flow rate of the coolant in the communication flow path R is adjusted so as to be more than each of the leakage amount from the first switching valve 21 and the leakage amount from the second switching valve 22 by adjusting the opening degree of the valve body 224 corresponding to the fourth inlet 22*f*.

Note that in the example shown in FIG. 9, the valve body 214 corresponding to the fourth outlet 21*f* of the first switching valve 21 may set both the first flow path 211 side and the second flow path 212 side with arbitrary intermediate openings degree to thereby mix and flow the coolant in the first coolant circulation circuit and the coolant in the second coolant circulation circuit in the sixth flow path 16.

The first reserve tank 65 whose internal pressure is maintained within a first predetermined range is connected to the first flow path 11 (first circuit formation flow path). When the volume of the coolant expands or contracts together with the changes in temperature of the coolant in the first coolant circulation circuit, thereby changing the pressure of the first coolant circulation circuit, the first coolant circulation circuit can exchange the coolant with the first reserve tank 65. Thus, the pressure of the first coolant circulation circuit can be maintained within an appropriate range.

Likewise, the second reserve tank 65 whose internal pressure is maintained within a second predetermined range is connected to the second flow path 12 (second circuit formation flow path). When the volume of the coolant expands or contracts together with the changes in temperature of the coolant in the first coolant circulation circuit, thereby changing the pressure of the second coolant circulation circuit, the first coolant circulation circuit can exchange the coolant with the second reserve tank 65. Thus, the pressure of the second coolant circulation circuit can be maintained within an appropriate range.

Because the first and second reserve tanks 65 are connected to one of the first flow path 11 and the second flow path 12, it prevents the coolant from being transferred between the first and second coolant circulation circuits via the reserve tank 65. As a result, when there is a difference in output between the first pump 23 and the second pump 24, the waste of the pump power due to the formation of the local loop circuit and the loss of heat due to the mixing of the coolants having different temperature zones can be prevented.

The first reserve tank 65 is connected to the downstream side of the coolant flow with respect to the radiator 26, and to the suction side of the first pump 23 in the first coolant circulation circuit, so that the pressure on the suction side of the first pump 23 becomes substantially the atmospheric pressure. This embodiment can prevent an increase in pressure loss due to the occurrence of cavitation and the breakdown of a coolant hose that might be caused when the pressure on the suction side of the first pump 23 becomes a negative pressure.

The second reserve tank 65 is connected to the downstream side of the coolant flow with respect to the cooler core 34 and the battery 37, and to the suction side of the second pump 24 in the second coolant circulation circuit, so that the pressure on the suction side of the second pump 24 becomes substantially the atmospheric pressure. This arrangement can prevent an increase in pressure loss due to the occurrence of cavitation and the breakdown of a coolant hose that might be caused as the pressure on the suction side of the first pump 24 becomes a negative pressure.

The communication flow path R for communication between the first and second coolant circulation circuits is formed in the second switching valve 22 on the downstream side. Thus, in the operation state where a discharge pressure of the pump in one of the first and second coolant circulation circuits exceeds a preset pressure of the pressurizing valve 654 of the reserve tank 65 disposed in the other circuit, the pressurizing valve 654 can be prevented from being opened. The reason for this will be described below.

For better understanding, in the description below, the operating state is assumed in which the first pump 23 is stopped and the second pump 24 is operating with a predetermined range of lift.

When the first pup 23 is stopped and the second pump 24 operates in a predetermined range of lift, there occurs a difference in pressure between the first and second coolant circulation circuits, thereby causing the valve leakage from the first and second switching valve 21 and 22. The coolant is often transferred between the first and second coolant circulation circuits in such a direction that equalizes the pressure therebetween.

Regarding the difference in pressure between the first and second coolant circulation circuits, normally, the pressure difference at the first switching valve 21 positioned on the upstream side (pump discharge side) is larger than that of the second switching valve 22 positioned on the downstream side (pump suction side). Thus, the amount of leakage in the first switching valve 21 is more than that in the second switching valve 22.

Suppose that when the communication flow path R is not formed, the pressures of the first and second coolant circulation circuits are equalized in the first switching valve 21 from which an amount of leakage is the most.

The second coolant circulation circuit is connected to the second reserve tank 65 including the negative pressure valve 653. When the second pump 24 operates in the predetermined range of lift, the pressure of the second coolant circulation circuit becomes substantially the atmospheric pressure on the suction side of the second pump 24, and becomes a level corresponding to addition of the atmospheric pressure and the lifting height of the second pump 24 on the discharge side of the second pump 24. Thus, the first coolant circulation circuit in which the first pump 23 is stopped substantially has the pressure corresponding to the addition of the atmospheric pressure and the lifting height of the second pump 24 in any position thereof.

Thus, when the lifting height of the second pump 24 exceeds the preset pressure of the pressurizing valve 654 of the first reserve tank 65, the pressurizing valve 654 might be opened even though the first pump 23 is stopped, and the coolant in the first coolant circulation circuit flows to the first reserve tank 65 to cause an increase in water level within the first reserve tank 65.

When the coolant in the first coolant circulation circuit flows to the first reserve tank 65, the coolant in the second coolant circulation circuit flows to the first coolant circulation circuit, so that its amount is reduced in the second coolant circulation circuit, thereby reducing the water level within the second reserve tank 65. If such a state continues, a phenomenon occurs in which the second reserve tank 65 becomes empty to suck the air. As a result, the second pump 24 might rotate without the coolant, causing a shaft or bearing of the second pump 24 to be melted and broken due to friction heat.

From this point, in the sixth embodiment of the invention, the communication flow path R for communication between the first coolant circulation circuit and the second coolant circulation circuit is formed in the second switching valve 22 positioned on the downstream side, so that the amount of transfer of the coolant between the first and second coolant circulation circuits becomes the most in the communication flow path R.

Thus, the presses in the first and second coolant circulation circuits are equalized in the communication flow path R in which the amount of transfer of the coolant becomes most. As mentioned above, the pressure of the second coolant circulation circuit becomes substantially atmospheric pressure on the suction side of the second pump 24, and thus the pressure at the second switching valve 22 also becomes substantially atmospheric pressure. As a result, the pressure in the first coolant circulation circuit becomes substantially atmospheric pressure, and thereby it can avoid the pressurizing valve 654 of the first reserve tank 65 from being opened.

The first and second reserve tanks 65 are independently connected to the first and second coolant circulation circuits, respectively, thereby having the following advantages (1) to (3), as compared to the case where the reserve tank 65 common to the first and second coolant circulation circuits is connected.

(1) This embodiment can respond well to abrupt changes in pressure. (2) Bubbles mixed in the coolant can be appropriately separated into gas and liquid components. (3) The coolant can be adequately charged upon replacing of the coolant.

Further, the first and second reserve tanks 65 connected to the first and second coolant circulation circuits, respectively, are of a sealed type. When there is a difference in lifting height between the first pump 23 and the second pump 24, the reserve tank 65 in the coolant circulation circuit on the low lift range side can be prevented from overflowing. The reason for this will be described below.

For better understanding, in the description below, an operating state is assumed in which the lifting height of the second pump 24 is higher than that of the first pump 23.

Suppose that the two reserve tanks are of the air-release type, the pressure in a connection portion of the second reserve tank in the second coolant circulation circuit (that is, the pressure on the suction side of the second pump 24) becomes substantially the atmospheric pressure. Therefore, a pressure PR2 in the connection portion of the second coolant circulation circuit with the communication flow path R is represented by the following formula:

$$PR2 = \text{Atmospheric Pressure} + \alpha - \text{Pressure Loss of Second Coolant Circulation Circuit}$$

in which α is a differential pressure generated by the second pump 24.

In the steady state, no coolant flows through between the first and second coolant circulation circuits, whereby the pressure PR1 in the connection portion of the first coolant circulation circuit with the communication flow path R is the same as the pressure PR2 in the connection portion of the second coolant circulation circuit with the communication flow path R.

In such a case, the pressure P1 (in other words, pressure on the suction side of the first pump 23) in the connection portion of the first coolant circulation circuit with the first reserve tank is decreased by a combination of a differential pressure generated by the first pump 23 and a pressure loss in the first coolant circulation circuit, as compared to the pressure PR1 in the connection portion of the first coolant circulation circuit with the communication flow path R. Here, when the differential pressure generated by the first pump 23 is 0.1α, a pressure P1 in the connection portion of the first coolant circulation circuit with the first reserve tank 65 is represented by the following formula:

$$P1 = \text{Atmospheric Pressure} + 0.9\alpha - (\text{Combination of Pressure Loss in First Coolant Circulation Circuit and Pressure Loss in Second Coolant Circulation Circuit}).$$

Since the pressure loss in the coolant circulation circuit cannot exceed the differential pressure generated by the pump, when the communication flow path R is away from a suction part of the pump, the pressure P1 in the connection portion of the first coolant circulation circuit with the first reserve tank 65 is found to be higher than the atmospheric pressure.

Thus, when the first and second reserve tanks 65 are of an air-release type, the coolant constantly flows into the first reserve tank 65. In this case, the water level of the coolant increases by a potential head which is the same amount as that of a pressure head (gauge pressure) in the connection portion of the first coolant circulation circuit with the first reserve tank, thereby causing the first reserve tank 65 to overflow due to the relationship between the capacity of the first reserve tank 65 and a difference from a lifting height of the first pump 23.

When the coolant flows into the first reserve tank 65, the coolant is supplied from the second reserve tank 65 by the amount thereof into the first reserve tank, and thereby it can make the second reserve tank 65 empty.

From this point, in the sixth embodiment of the invention, the first and second reserve tanks 65 are of a sealed type. When the coolant flows into the first reserve tank 65, the internal pressure of the first reserve tank 65 is increased. As a result, the increase in water level inside the first reserve tank 65 can be suppressed.

Figure 10:
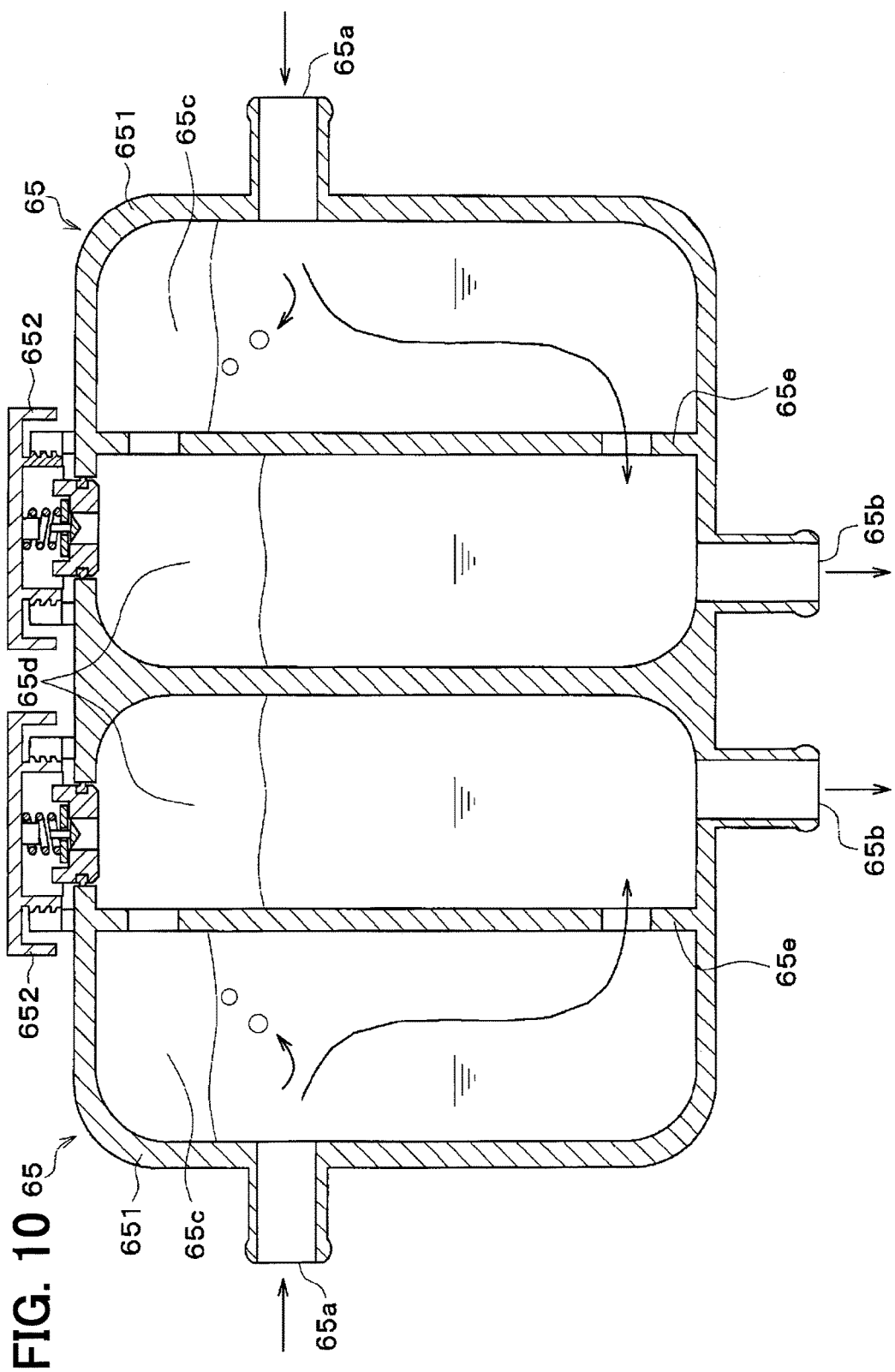
FIG. 10 is a cross-sectional view of a reserve tank in the sixth embodiment.

As shown in FIG. 10, two sealed-type reserve tanks 65 can be integrated together to improve the mountability of the reserve tank 65 on the vehicle.

(Seventh Embodiment)

Figure 11:
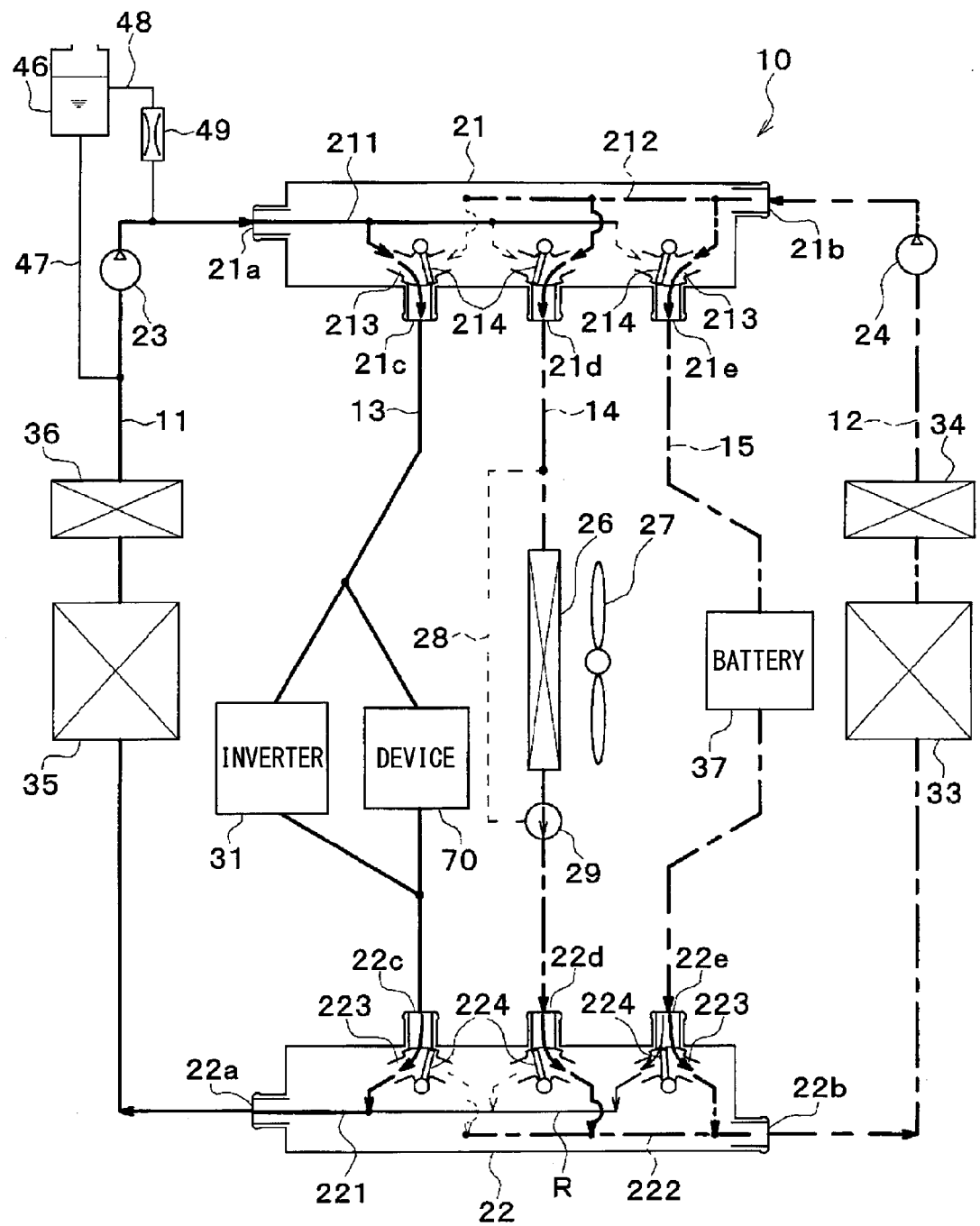
FIG. 11 is an entire configuration diagram of a thermal management system for a vehicle according to a seventh embodiment of the invention.

As shown in FIG. 11, a seventh embodiment of the invention differs from the first embodiment in the arrangement of the devices.

In the first flow path 11, the first pump 23, the condenser 35, and the heater core 36 are arranged in series with each other. In the second flow path 12, the second pump 24, the chiller 33, and the cooler core 34 are arranged in series with each other.

In the third flow path 13, the inverter 31 and a temperature adjustment target device 70 are disposed in parallel with each other. In the fourth path 14, the radiator 26 is disposed. A part of the fourth flow path 14 on the side of the second switching valve 22 with respect to the radiator 26 is connected to one end side of the bypass flow path 28 via the three-way valve 29. Another part of the fourth flow path 14 on the side of the first switching valve 21 with respect to the radiator 26 is connected to the other end side of the bypass flow path 28. The three-way valve 29 switches between the flow of the heat medium in the fourth flow path 14 to the radiator 26, and the flow of the heat medium to the bypass flow path 28. In the fifth flow path 15, the battery 37 is disposed.

In an example shown in FIG. 11, the fourth outlet 21f of the first switching valve 21, and the fourth inlet 22f and the sixth flow path 16 of the second switching valve 22 are not provided.

Also, in a seventh embodiment of the invention, like the first embodiment, the controller 50 controls the operations of the electric actuator 51 for the first switching valve 21 and the electric actuator 52 for the second switching valve 22 to switch among various kinds of operation modes.

Specifically, the first flow path 11 and at least one of the third to fifth flow paths 13 to 15 form the first coolant circulation circuit (first heat medium circuit). The second flow path 12 and the remaining flow path among the third to fifth flow paths 13 to 15 form the second coolant circulation circuit (second heat medium circuit).

In the example shown in FIG. 11, the first and third flow paths 11 and 13 communicate with each other to thereby form the first coolant circulation circuit indicated by thick solid lines of FIG. 11, whereas the second, fourth, and fifth flow paths 12, 14, and 15 communicate with each other to thereby form the second coolant circulation circuit indicated by thick alternate long and short dash lines of FIG. 11.

Further, in the example shown in FIG. 11, the valve body 224 corresponding to the outlet 22e is open in a small amount on the side of the first flow path 211 such that the first coolant circulation circuit communicates with the second coolant circulation circuit in the second switching valve 22 positioned on the downstream side. As a result, a communication flow path R for communication between the first and second coolant circulation circuits is formed within the second switching valve 22. This embodiment can also obtain the same operations and effects as those of the first embodiment described above.

(Eighth Embodiment)

Figure 12:
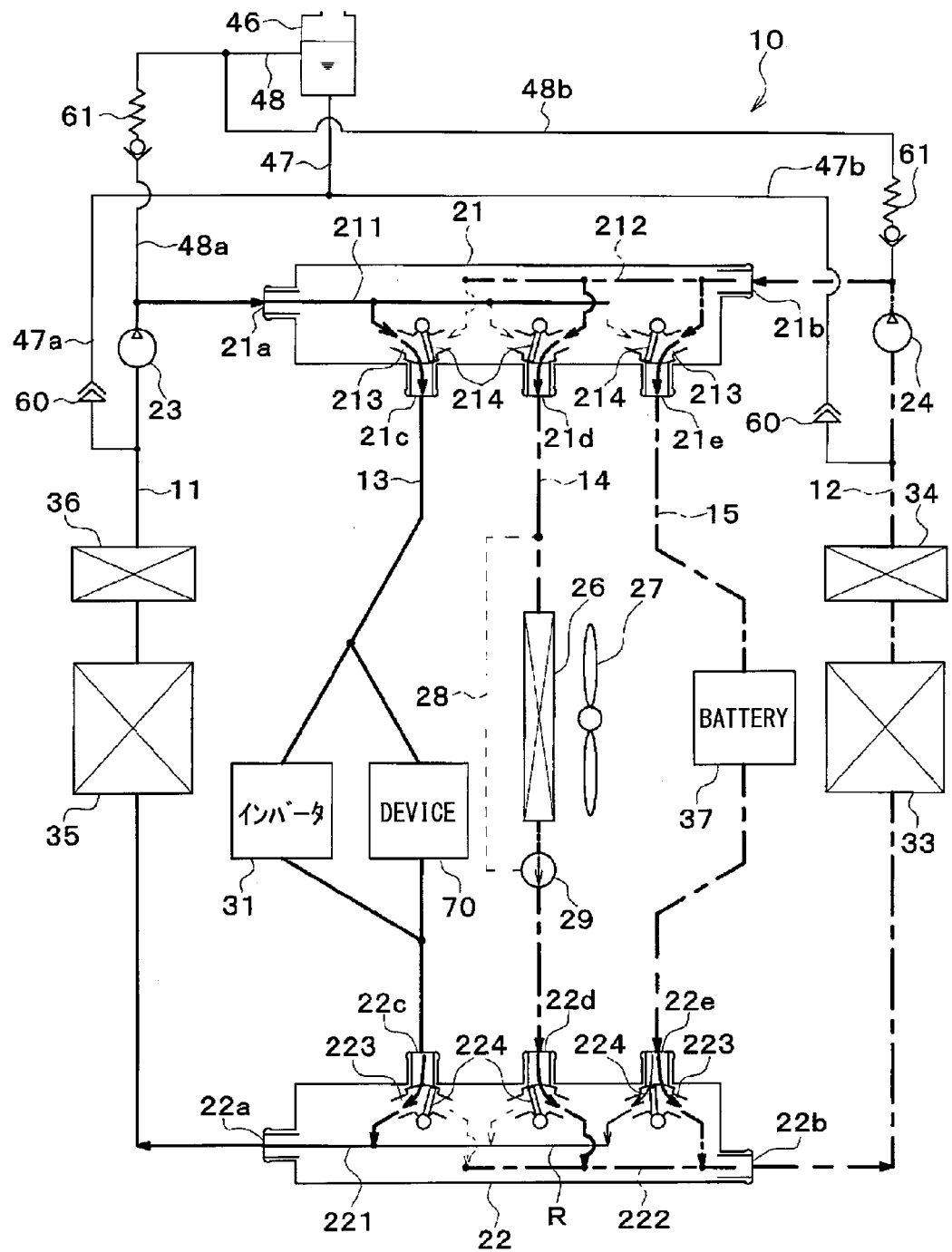
FIG. 12 is an entire configuration diagram of a thermal management system for a vehicle according to an eighth embodiment of the invention.

In an eighth embodiment of the invention, as shown in FIG. 12, the connection structure of a reserve tank 46 is configured in the same way as that of the third embodiment with respect to the structure of the above seventh embodiment. That is, the air-release type reserve tank 46 is connected not only to the first flow path 11, but also to the second flow path 12. Negative pressure valves 60 are respectively disposed in the two parts 47a and 47b into which the main connection flow path 47 is branched. Pressurizing valves 61 are disposed in the two parts 48a and 48b into which the sub-connection flow path 48 is branched.

Like the first embodiment, the controller 50 controls the operations of the electric actuator 51 for the first switching valve 21 and the electric actuator 52 for the second switching valve 22 to switch among various kinds of operation modes.

Specifically, the first flow path 11 (first pump arrangement flow path) and at least one of the third to fifth flow paths 13 to 15 form the first coolant circulation circuit (first heat medium circuit). The second flow path 12 (second pump arrangement flow path) and the remaining flow path among the third to fifth flow paths 13 to 15 form the second coolant circulation circuit (second heat medium circuit).

In the example shown in FIG. 12, the first and third flow paths 11 and 13 communicate with each other to thereby form the first coolant circulation circuit indicated by thick solid lines of FIG. 12, whereas the second, fourth, and fifth flow paths 12, 14, and 15 communicate with each other to thereby form the second coolant circulation circuit indicated by thick alternate long and short dash lines of FIG. 12.

Further, in the example shown in FIG. 12, the valve body 224 corresponding to the outlet 22e is open in a small amount on the first flow path 211 side such that the first coolant circulation circuit communicates with the second coolant circulation circuit in the second switching valve 22 positioned on the downstream side. As a result, a communication flow path R for communication between the first coolant circulation circuit and the second coolant circulation circuit is formed within the second switching valve 22. This embodiment can also obtain the same operation and effects as those of the third embodiment described above.

(Ninth Embodiment)

Figure 13:
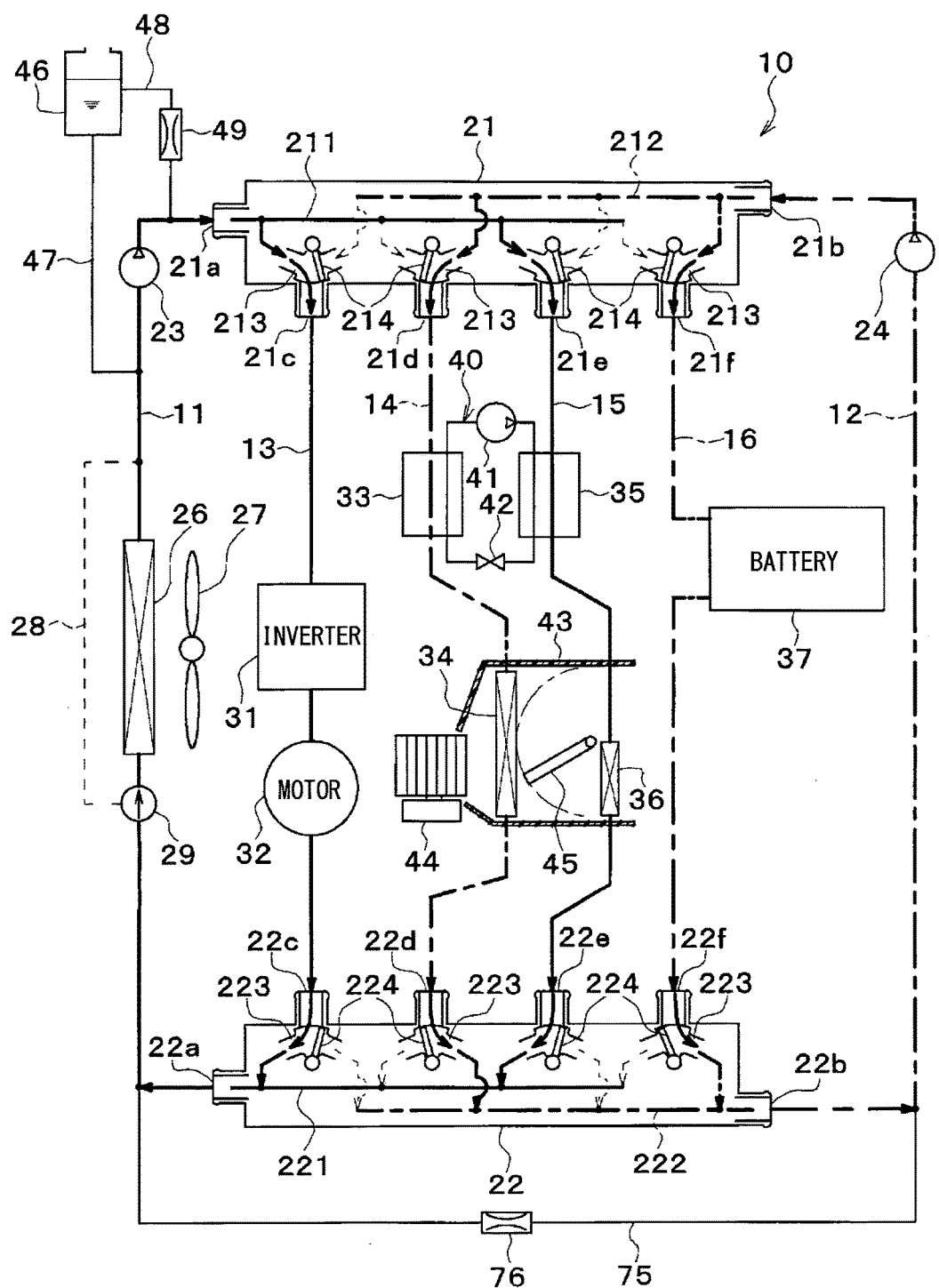
FIG. 13 is an entire configuration diagram of a thermal management system for a vehicle according to a ninth embodiment of the invention.

Although in the above-mentioned first embodiment, the communication flow path R is formed inside the second switching valve 22, in a ninth embodiment of the invention, as shown in FIG. 13, a communication flow path 75 is formed outside the second switching valve 22.

One end of the communication flow path 75 is connected to a part between the first outlet 22a of the second switching valve 22 and the suction port of the first pump 23 in the first flow path 11. The other end of the communication flow path 75 is connected to a part between the second outlet 22b of the second switching valve 22 and the suction port of the second pump 24 in the second flow path 12.

A flow path throttle 76 is disposed in the communication flow path 75. Specifically, the dimensions and the like of the communication flow path 75 and the flow path throttle 76 are set such that the flow rate of the coolant in the communication flow path 75 is more than each of the leakage amount from the first switching valve 21 and the leakage amount from the second switching valve 22. Instead of the flow path throttle 76, the entire communication flow path 75 may be configured for a pipe with a fine diameter.

Like the above-mentioned first embodiment, the first switching valve 21 and the second switching valve 22 are switched to perform switching among various operation modes. In the example shown in FIG. 13, like the example shown in FIG. 1, the first, third, and fifth flow paths 11, 13, and 15 communicate with each other to thereby form the first coolant circulation circuit indicated by thick solid lines of FIG. 13, whereas the second, fourth, and sixth flow paths 12, 14, and 16 communicate with each other to thereby form the second coolant circulation circuit indicated by thick alternate long and short dash lines of FIG. 13.

In the ninth embodiment, because the communication flow path 75 can establish communication between the first coolant circulation circuit and the second coolant circulation circuit on its downstream side (pump suction side), it can obtain the same operations and effects as those of the first embodiment.

(Tenth Embodiment)

Although in the above-mentioned first to ninth embodiments, the first switching valve 21 and the second switching valve 22 each are configured of a multi-way valve, in a tenth embodiment, a first switching valve 81 and a second switching valve 82 each are configured of a four-way valve.

Figure 14:
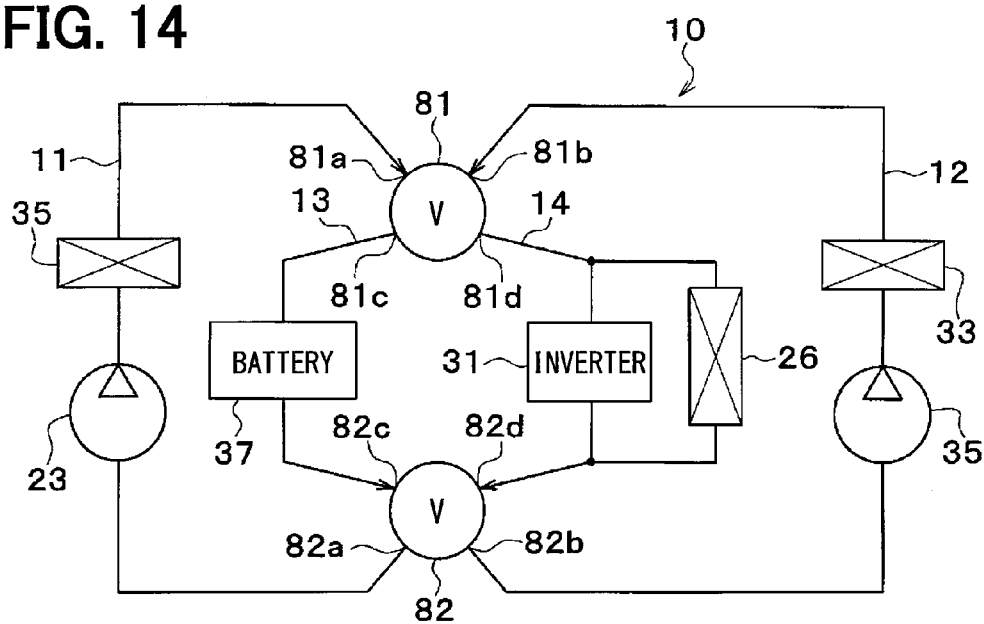
FIG. 14 is an entire configuration diagram of a thermal management system for a vehicle according to a tenth embodiment of the invention.

FIG. 14 shows a system configuration in the tenth embodiment. FIG. 14 omits the illustration of the reserve tank. However, the connection structure of the reserve tank 46 is the same as that of the reserve tank in each of the first to ninth embodiments.

In the first flow path 11 (first pump arrangement flow path), the first pump 23 and the condenser 35 are disposed in series with each other. In the second flow path 12 (second pump arrangement flow path), the first pump 24 and the chiller 33 are disposed in series with each other.

In the third path 13, the battery 37 is disposed. In the fourth flow path 14, the inverter 31 and the radiator 26 are disposed in parallel with each other. In the tenth embodiment of the invention, the fifth and sixth flow paths 15 and 16 are not provided.

The first switching valve 81 has a first inlet 81a and a second inlet 81b into which the coolant flows, and a first outlet 81c and a second outlet 81d from which the coolant flows. The first switching valve 81 is a first switch for switching the communication state among the first and second inlets 81a and 81b and the first and second outlets 81c and 81d.

The first inlet 21a is connected to one end side of the first flow path 11. The second inlet 21b is connected to one end side of the second flow path 12. The first outlet 21c is connected to one end side of the third flow path 13. The second outlet 21d is connected to one end side of the fourth flow path 14.

The second switching valve 82 has a first inlet 82a and a second outlet 82b from which the coolant flows, and a first inlet 82c and a second outlet 82d into which the coolant flows. The second switching valve 82 is a second switch for switching the communication state among the first and second outlets 82a and 82b and the first and second inlets 82c and 82d.

The first outlet 82a is connected to the other end side of the first flow path 11. The second outlet 82b is connected to the other end side of the second flow path 12. The first inlet 82c is connected to the other end side of the third flow path 13. The second inlet 82d is connected to the other end side of the fourth flow path 14.

Both the first pump 23 and the second pump 24 are arranged to suck the coolant from a side of the second switching valve 82 and to discharge the coolant toward a side of the first switching valve 81.

Figure 15:
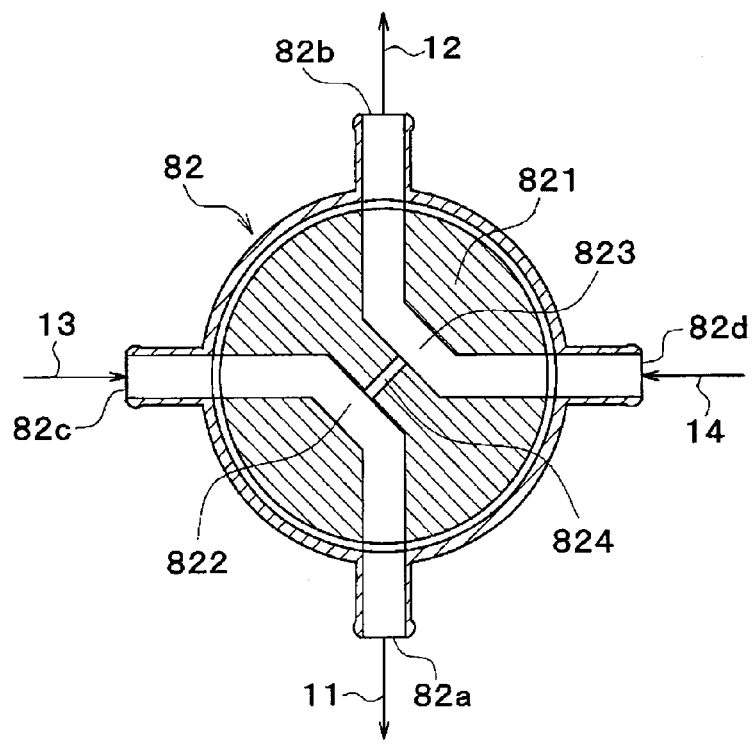
FIG. 15 is a cross-sectional view of a second switching valve in the tenth embodiment.

FIG. 15 shows the specific structure of the second switching valve 82. The second switching valve 82 includes a valve body 821 that rotates. The valve body 821 is provided with a first valve body flow path 822, and a second valve body flow path 823. The valve body 821 is rotated to a first rotation position shown in FIG. 15, and a second rotation position (not shown). In the first rotation position, the first valve body flow path 822 communicates with the first outlet 82a and the first inlet 82c, and the second valve body flow path 823 communicates with the second outlet 82b and the second inlet 82d. In the second rotation position, the first valve body flow path 822 communicates with the first outlet 82a and the second inlet 82d, and the second valve body flow path 823 communicates with the second outlet 82b and the first inlet 82c. The valve body 821 is driven by an electric actuator (not shown).

Further, the valve body 821 is provided with a communication flow path 824 for communication between the first valve body flow path 822, and the second valve body flow path 823.

The first switching valve 81 has the same basic structure as that of the second switching valve 82, but does not have the structure corresponding to the communication flow path 824 of the second switching valve 82, which differs from the second switching valve 82.

Now, the operation of the above-mentioned structure will be described. The controller 50 controls the operations of the electric actuator for the first switching valve 81 and the electric actuator for the second switching valve 82 to thereby switch among various kinds of operation modes.

Specifically, the first flow path 11 and at least one of the third and fourth flow paths 13 and 14 form the first coolant circulation circuit (first heat medium circuit). The second flow path 12 and the remaining other one of the third and fourth flow paths 13 and 14 form the second coolant circulation circuit (second heat medium circuit).

The first and second coolant circulation circuits communicate with each other by the communication flow path 824 formed in the second switching valve 82. That is, the first and second coolant circulation circuits communicate with each other on the downstream side (pump suction side). Thus, this embodiment can also obtain the same operation and effects as those of the first embodiment described above.

(Eleventh Embodiment)

Figure 16:
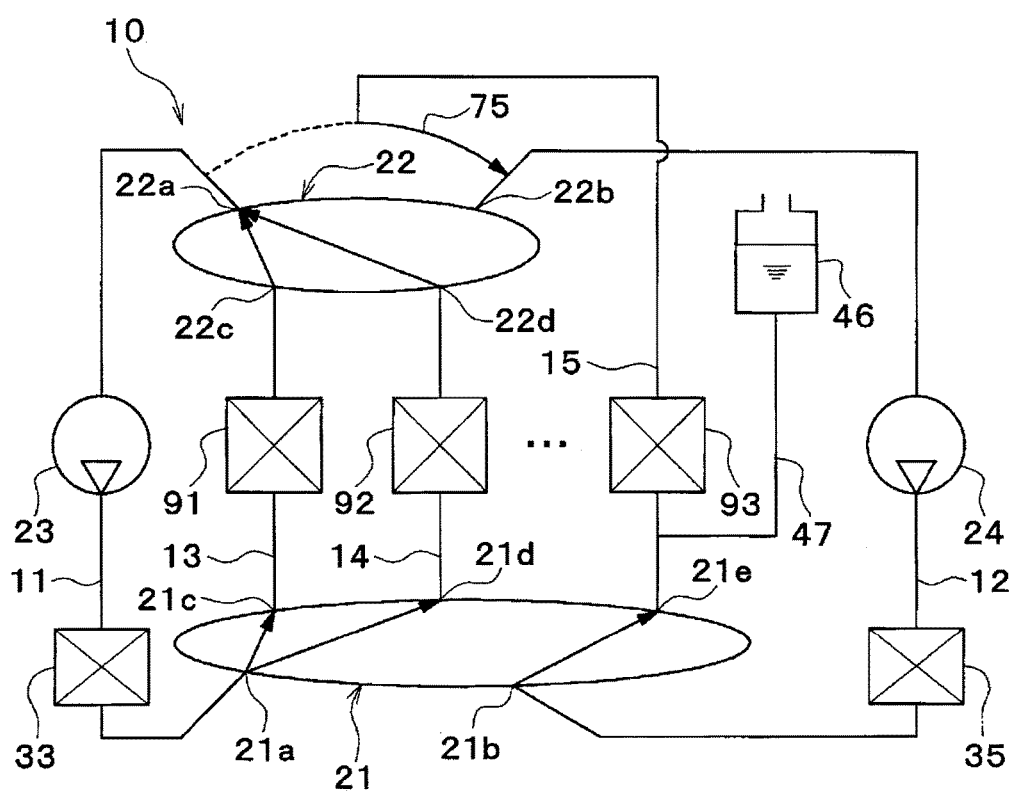
FIG. 16 is an entire configuration diagram of a thermal management system for a vehicle, while showing one operation mode according to an eleventh embodiment of the invention.
Figure 17:
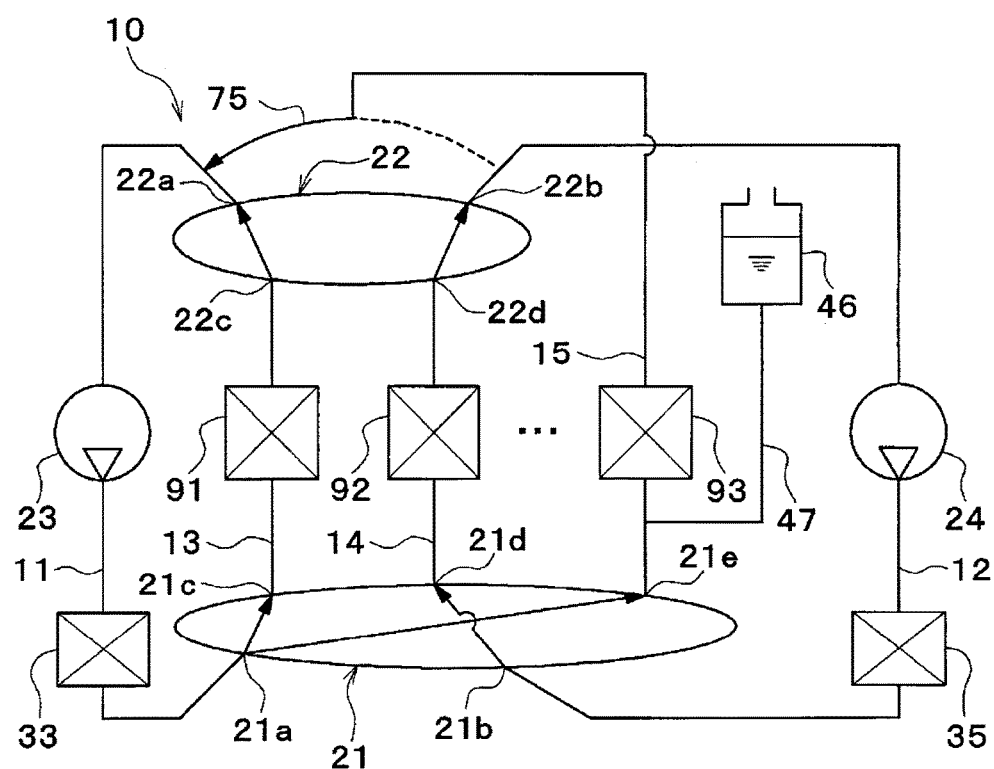
FIG. 17 is an entire configuration diagram of the thermal management system for a vehicle, while showing another operation mode in the eleventh embodiment.

Although in the respective embodiments, each of the device arrangement flow paths with the temperature adjustment devices 31 to 37 disposed therein is connected to both the first switching valve 21 and the second switching valve 22, in an eleventh embodiment as shown in FIGS. 16 and 17, the fifth flow path 15 is not connected to the second switching valve 22, but to the communication flow path 75.

The communication flow path 75 configures a branch passage for branching the fifth flow path 15 into the first flow path 11 side and the second flow path 12 side. The reserve tank 46 is connected to the fifth flow path 15 via the tank connection flow path 47.

When the designed pressure of a device positioned in the fifth flow path 15 is higher by a predetermined amount than the designed pressure of the reserve tank 46 (which is equal to a pressure adjustment preset value), the tank connection flow path 47 is connected to the downstream side of the coolant flow of the device. When the designed pressure of the device positioned in the fifth flow path 15 is lower by a predetermined amount than the designed pressure of the reserve tank 46, the tank connection flow path 47 is connected to the upstream side of the coolant flow of the device. As a result, the pressure range of the device can be maintained to an appropriate one.

The fifth flow path 15 is a switching target flow path that can be switched to between the first flow path 11 side (first coolant circulation circuit side) and the second flow path 12 side (second coolant circulation circuit side).

FIGS. 16 and 17 illustrate parts of the device arrangement flow paths 13, 14, and 15 as the device arrangement flow path, and omit illustration of other device arrangement flow paths. In the device arrangement flow paths 13, 14, and 15, various temperature adjustment target devices 91, 92, and 93 are disposed. The temperature adjustment target devices 91, 92, and 93 each are a coolant circulation device (heat medium circulation device) for allowing the coolant to circulate therethrough.

In the examples shown in FIGS. 16 and 17, the chiller 33 is disposed in the first flow path 11, and the condenser 35 is disposed in the second flow path 12. Alternatively, any device other than the chiller 33 and condenser 35 may be disposed in the first flow path 11 and the second flow path 12. The first flow path 11 and second flow path 12 are not necessarily provided with any device.

As shown in FIG. 16, when the first switching valve 21 connects the fifth flow path 15 to the second flow path 12 side, the coolant having flowed through the fifth flow path 15 flows into the second flow path 12, but does not flow into the first flow path 11. That is, although a circuit for circulation of the coolant is formed between the fifth flow path 15 and the second flow path 12, no circuit for circulation of the coolant is formed between the fifth flow path 15 and the first flow path 11, and thereby it cannot cause the inflow of the coolant in a steady state from the fifth flow path 15 to the first flow path 11.

As shown in FIG. 17, when the first switching valve 21 connects the fifth flow path 15 to the first flow path 11 side, the coolant having flowed through the fifth flow path 15 flows into the first flow path 12, but does not flow into the second flow path 12. That is, although a circuit for circulation of the coolant is formed between the fifth flow path 15 and the first flow path 11, no circuit for circulation of the coolant is formed between the fifth flow path 15 and the second flow path 12, and thereby it cannot cause the inflow of the coolant in a steady state from the fifth flow path 15 to the second flow path 12.

In the eleventh embodiment of the invention, the fifth flow path 15 is connected to the communication flow path 75 and the first switching valve 21. Thus, because the fifth flow path 15 may not be connected to the second switching valve 22, it can decrease the number of (number of ports) of the coolant outlets in the second switching valve 22, thereby simplifying the structure of the second switching valve 22.

Figure 18:
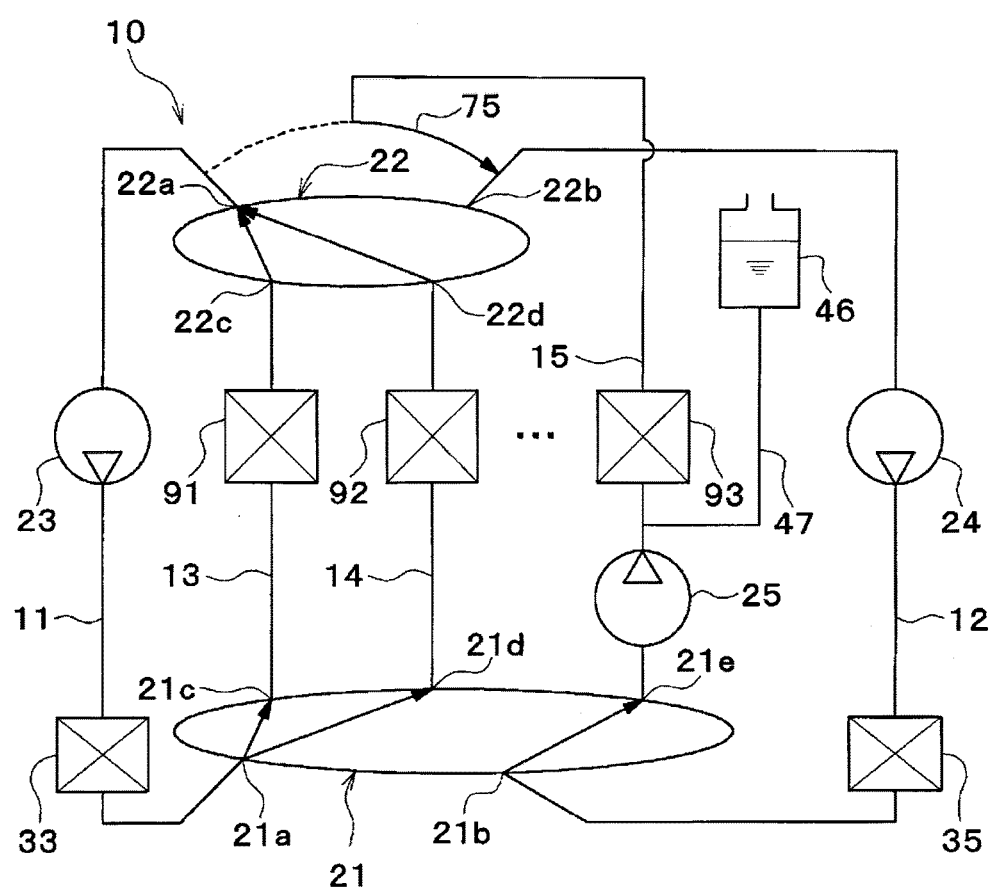
FIG. 18 is an entire configuration diagram of a thermal management system for a vehicle according to a first modified example of the eleventh embodiment.

In a second modified example shown in FIG. 18, the pump 25 (pump for a switching target flow path) is disposed in the fifth flow path 15 (switching target flow path), so that the flow rate of the fifth flow path 15 can be adjusted by control of a driving force of the pump 25. By adjusting the flow rate of the fifth flow path 15, the temperature adjustment of the temperature adjustment target device disposed in the fifth flow path 15, and the amount of heat dissipated and absorbed from and into the temperature adjustment target device 93 can be precisely controlled.

Even when the second switching valve 22 is broken, the circulation of the coolant through the fifth flow path 15 can be continued. Specifically, since the temperature adjustment target device 93 is disposed in the fifth flow path 15, in the event of failure of the second switching valve 22, the circulation of the coolant can be continued for the temperature adjustment target device 93 to continuously maintain the temperature adjustment of the temperature adjustment target device 93.

One end of the communication flow path 75 may be connected to a part of the flow paths forming the first coolant circulation circuit between the valve body 224 of the second switching valve 22 (see FIG. 13), and a coolant suction portion (heat medium suction portion) of the first pump 23. The other end of the communication flow path 75 may be connected to a part of the second coolant circulation circuit between the valve body 224 and a coolant suction portion (heat medium suction portion) of the second pump 24.

Figure 19:
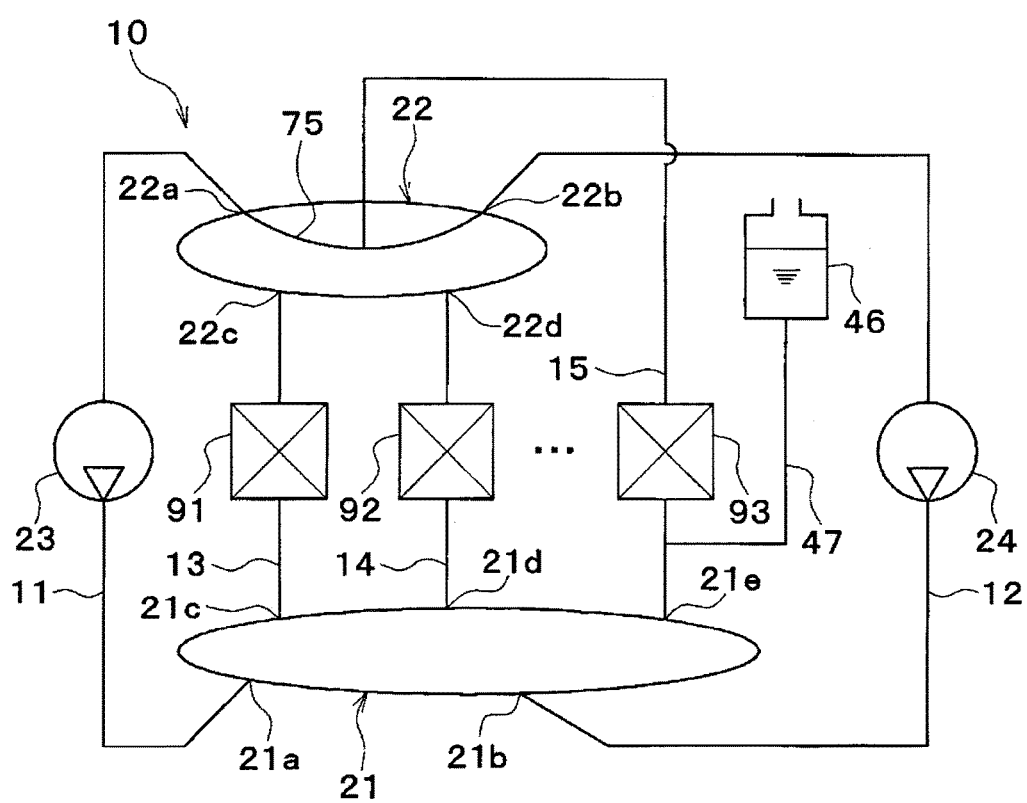
FIG. 19 is an entire configuration diagram of a thermal management system for a vehicle according to a second modified example of the eleventh embodiment.

In a second modified example shown in FIG. 19, the communication flow path 75 may be formed inside the second switching valve 22.

(Twelfth Embodiment)

Figure 20:
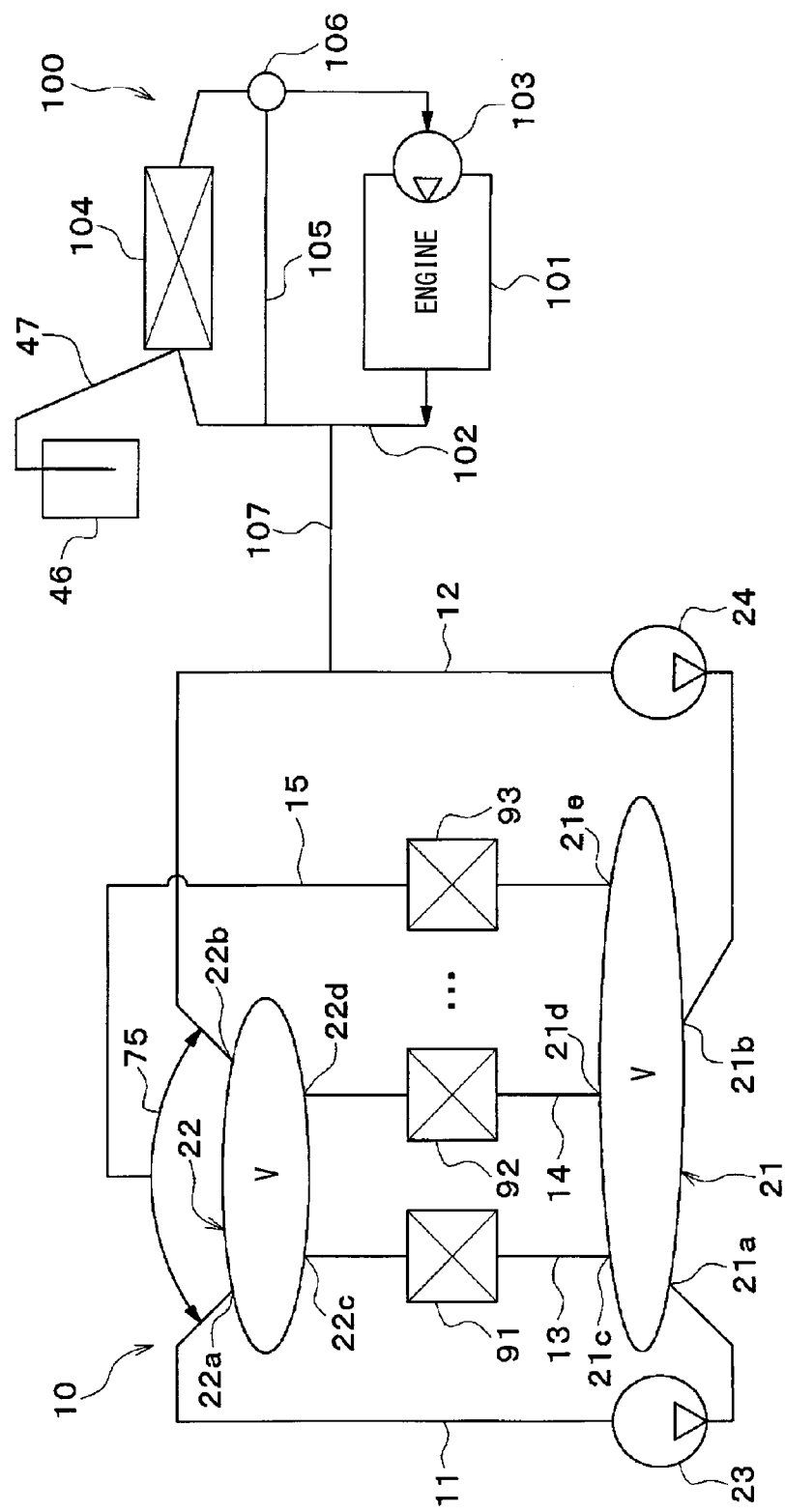
FIG. 20 is an entire configuration diagram of a thermal management system for a vehicle according to a twelfth embodiment of the invention.

In a twelfth embodiment, as shown in FIG. 20, the reserve tank 46 is connected to the second flow path 12 via an engine cooling circuit 100.

The engine cooling circuit 100 is a coolant circulation circuit for cooling an engine 101. The engine cooling circuit 100 includes a circulation flow path 102 for allowing the circulation of the coolant. In the circulation flow path 102, the engine 101, the third pump 103, and the radiator 104 are disposed.

The third pump 103 is an electric pump for sucking and discharging the coolant. The third pump 103 may be a mechanical pump driven by a power output from the engine 101.

The radiator 104 is a heat exchanger for heat dissipation (air-heat medium heat exchanger) that dissipates heat of the coolant into the outside air by exchanging heat between the coolant and the outside air.

The circulation flow path 102 is connected to a radiator bypass flow path 105. The radiator bypass flow path 105 is a flow path through which the coolant flows while bypassing the radiator 104.

A thermostat 106 is disposed in a connection portion between the radiator bypass flow path 105 and the circulation flow path 102. The thermostat 106 is a coolant-temperature responsive valve constructed of a mechanical mechanism that is designed to open and close a coolant flow path by displacing a valve body using a thermo wax (temperature sensing member) whose volume changes in response to the temperature.

Specifically, when the temperature of coolant exceeds a predetermined temperature (for example, 80° C. or higher), the thermostat 106 closes the radiator bypass flow path 105. When the temperature of coolant is lower than the predetermined temperature (for example, less than 80° C.), the thermostat 106 opens the radiator bypass flow path 105.

The engine cooling circuit 100 is connected to the second flow path 12 via the connection flow path 107. The connection flow path 107 is a connection flow path for connection between the engine cooling circuit 100 and the first and second coolant circulation circuits. In an example shown in FIG. 20, one connection flow path 107 is provided, but two or more (a plurality of) connection flow paths 107 may be provided.

The reserve tank 46 is connected to the circulation flow path 102 via the tank connection flow path 47. Thus, the reserve tank 46 is connected to the second flow path 12 via the engine cooling circuit 100. In other words, the reserve tank 46 is connected to the first coolant circulation circuit and the second coolant circulation circuit via the engine cooling circuit 100.

In the twelfth embodiment of the invention, one reserve tank 46 can be shared among three circuits, namely, the first coolant circulation circuit, the second coolant circulation circuit, and the engine cooling circuit 100, thereby simplifying the structure.

Like the twelfth embodiment, even though the reserve tank 46 is connected to the circulation flow path 102 of the engine cooling circuit 100, the same operations and effects as those of the respective embodiments described above can be exhibited.

(Thirteenth Embodiment)

Figure 21:
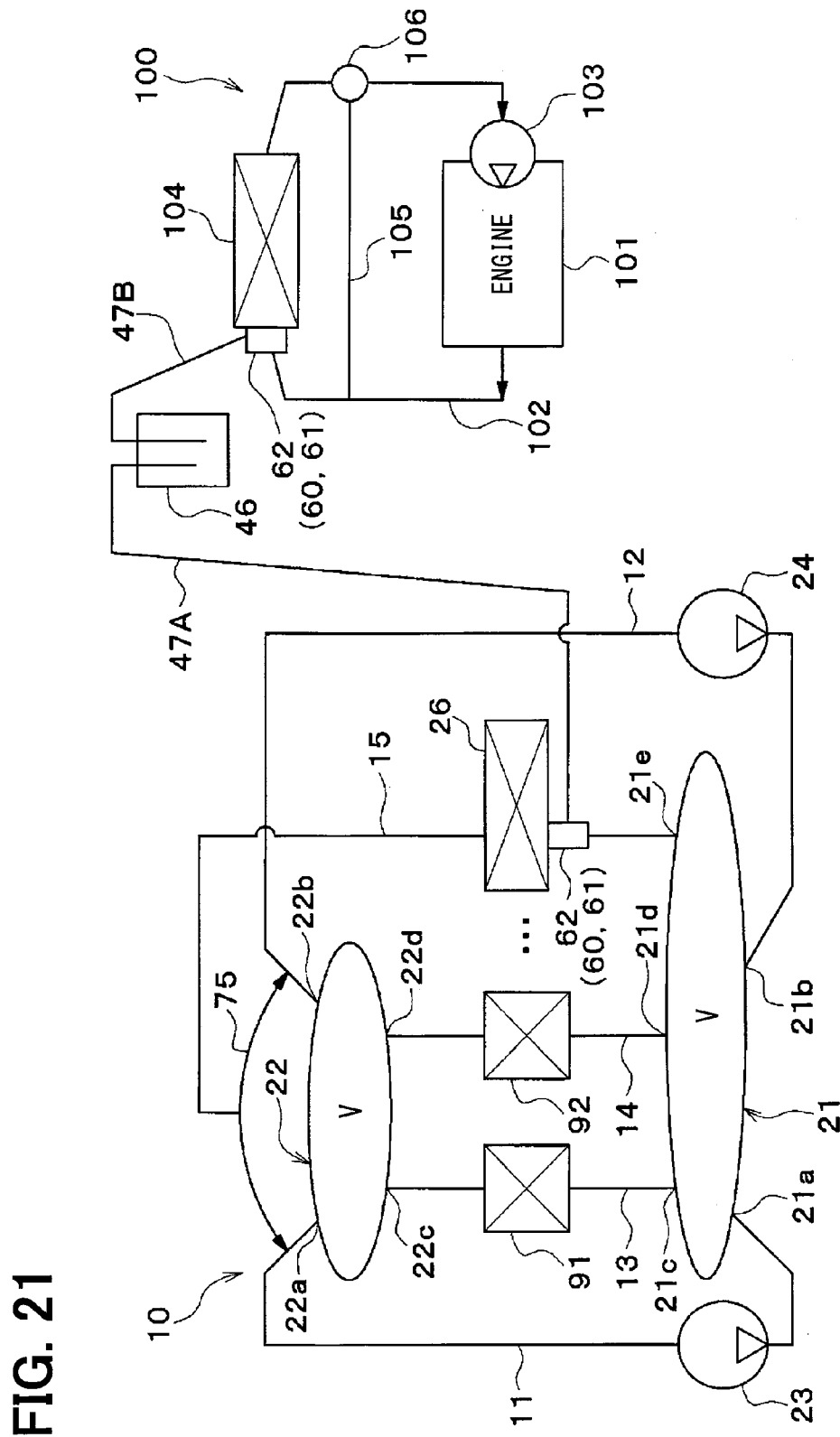
FIG. 21 is an entire configuration diagram of a thermal management system for a vehicle according to a thirteenth embodiment of the invention.

In a thirteenth embodiment, as shown in FIG. 21, one reserve tank 46 is connected not only to the circulation flow path 102 of the engine cooling circuit 100 but also to the fifth flow path 15.

The reserve tank 46 is connected to the engine cooling circuit 100 and the fifth flow path 15 via the same cap structural portion 62 (negative pressure valve 60, pressurizing valve 61) as that of the fourth embodiment shown in FIG. 6, and the tank connection flow paths 47A and 47B.

The cap structural portion 62 serves as a pressure adjuster for adjusting the pressure of coolant. The cap structural portion 62 on a side of the engine cooling circuit 100 is attached to the radiator 104 of the engine cooling circuit 100. The cap structural portion 62 on a side of the fifth flow path 15 is attached to the radiator 26 disposed in the fifth flow path 15.

Figure 22:
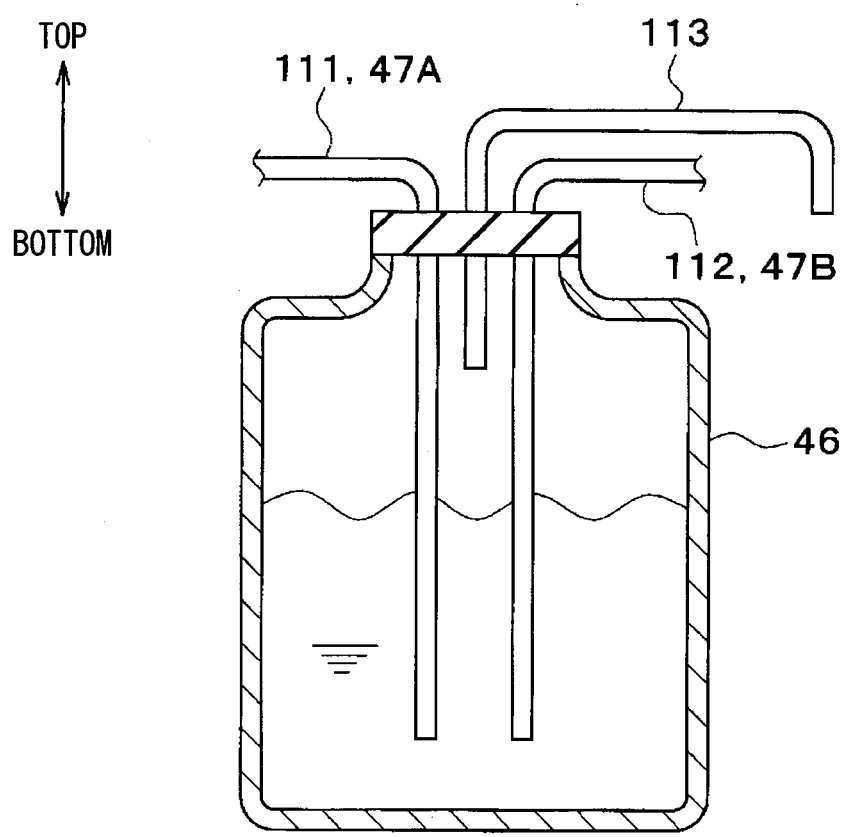
FIG. 22 is a cross-sectional view of a reserve tank in the thirteenth embodiment.

As shown in FIG. 22, a pipe 111 for a first flow path, a pipe 112 for a second flow path, and a pipe 113 for air are inserted into a container forming the reserve tank 46. The pipe 111 for the first flow path forms the tank connection flow path 47A on the fifth flow path 15 side. The pipe 112 for the second flow path 112 forms the tank connection flow path 47B on the engine cooling circuit 100 side. The pipe 111 for the first flow path and the pipe 112 for the second flow path are inserted into under a liquid surface of the coolant within the reserve tank 46.

The pipe 113 for air is a pipe for causing the space in the reserve tank 46 to communicate with the air. The pipe 113 is inserted into above the liquid surface of the coolant within the reserve tank 46. Thus, the pressure at the liquid surface of the coolant stored in the reserve tank 46 becomes atmospheric pressure. The reserve tank 46 may be configured such that the pressure at the liquid surface of the coolant stored therein becomes a predetermined pressure (pressure different from the atmospheric pressure).

In the thirteenth embodiment, one reserve tank 46 can be shared among three circuits, namely, the first coolant circulation circuit, the second coolant circulation circuit, and the engine cooling circuit 100, thereby simplifying the structure.

According to the thirteenth embodiment, when the internal pressure of the fifth flow path 15 exceeds a predetermined range, the negative pressure valve 60 or pressurizing valve 61 provided in the cap structural portion 62 is closed, so that the pressure of the first and second coolant circulation circuits can be maintained within the predetermined range. Further, when the internal pressure of the circulation flow path 102 of the engine cooling circuit 100 exceeds a predetermined range, the negative pressure valve 60 or pressurizing valve 61 provided in the cap structural portion 62 is closed, so that the pressure of the engine cooling circuit 100 can be maintained within the predetermined range. Moreover, when the internal pressure of the reserve tank 46 exceeds a predetermined range, the negative pressure valve 60 or pressurizing valve 61 provided in the cap structural portion 62 is closed, so that the internal pressure of the reserve tank 46 can be maintained within the predetermined range.

In the thirteenth embodiment, the cap structural portion 62 is attached to the radiators 26 and 104, and thereby it can easily discharge air retained in tank portions of the radiators 26 and 104 while easily using the existing radiator structure.

(Other Embodiments)

The above-mentioned other embodiments can be appropriately combined together. Various modifications and changes can be made to the above-mentioned embodiments as follows.

(1) Various devices can be used as the temperature adjustment target device. For example, the temperature adjustment target device may be a heat exchanger incorporated in a seat where a passenger sits and adapted to cool and heat the seat by coolant. The number of temperature adjustment target devices may be any number as long as the number is a plural number (two or more).

(2) In each of the above-mentioned embodiments, the coolant may intermittently circulate through the temperature adjustment target device to thereby control the heat exchanging capacity for the temperature adjustment target device.

(3) In the embodiments described above, the chiller 33 for cooling the coolant by the low-pressure refrigerant of the refrigeration cycle 40 is used as the cooler for cooling the coolant. However, a Peltier element may be used as the cooler.

(4) In each of the above-mentioned embodiments, the coolant is used as the heat medium. Alternatively, various kinds of media, such as oil, may be used as the heat medium.

(5) Nano-fluid may be used as the coolant (heat medium). The nano-fluid is a fluid into which nanoparticles with a particle diameter of the order of nanometer are mixed. Mixing of the nanoparticles into the coolant can have the following effect, in addition to the same effect of decreasing a freezing point as that in use of a coolant using ethylene glycol (so-called antifreeze solution).

The obtained operations and effects include improvement of a thermal conductivity in a specific temperature range, increase in heat capacity of the coolant, prevention of corrosion of a metal pipe or degradation of a rubber pipe, and enhancing a fluidity of the coolant at an ultralow temperature.

Such operations and effects vary depending on the composition, shape, and compounding ratio of a nanoparticle, an additive, and the like.

This arrangement can improve the thermal conductivity, and thus can obtain the same cooling efficiency, even though the above solution containing the nanoparticles is used in a small amount, as compared to the ethylene glycol coolant.

A thermal capacity of the coolant can be increased to increase the amount of the cold heat stored in the coolant itself (cold stored heat due to sensible heat).

An aspect ratio of the nanoparticle is preferably equal to or more than 50. This is because sufficient heat conductivity can be obtained. The term "aspect ratio" as used herein means a shape index indicative of a ratio between the longitudinal and lateral dimensions of the nanoparticle.

Nanoparticles for use can include any one of Au, Ag, Cu, and C. Specifically, as atoms of the nanoparticles, an Au nanoparticle, an Ag nanowire, a CNT (carbon nanotube), a graphene, a graphite core shell type nano particle (grain body having a structure surrounding the above-mentioned atom, such as a carbonnanotube), an Au nanoparticle-containing CNT, etc., can be used.

(6) The refrigeration cycle 40 in each of the above embodiments employs a fluorocarbon refrigerant as the refrigerant. However, the kind of the refrigerant is not limited to such a kind of refrigerant. Specifically, a natural refrigerant, such as carbon dioxide, a hydrocarbon-based refrigerant, and the like may also be used as the refrigerant.

The refrigeration cycle 40 of each of the above embodiments forms a subcritical refrigeration cycle whose high-pressure side refrigerant pressure does not exceed a critical pressure of the refrigerant. Alternatively, the refrigeration cycle may form a supercritical refrigeration cycle whose high-pressure side refrigerant pressure exceeds the critical pressure of the refrigerant.

(7) In each of the above-mentioned embodiments, the vehicle cooling system of the present disclosure is applied to the hybrid car by way of example.

Alternatively, the present disclosure may be applied to an electric car which obtains a driving force for traveling from an electric motor for traveling without including an engine, a fuel cell vehicle which uses a fuel cell as a traveling energy generator, or the like.

(8) Although in each of the above-mentioned embodiments, a door-type valve body is used as the valve bodies 214 and 224 of the first switching valve 21 and the second switching valve 22, a rotary valve or butterfly type valve body may be used as the valve body of the first and second switching valves 21 and 22.

(9) Although in each of the above-mentioned embodiments, the reserve tanks 46 and 65 are connected to the first and second flow paths 11 and 12 by way of example, the reserve tanks 46 and 65 may be connected to the third to sixth flow paths 13 to 16.

(10) Although in each of the above-mentioned embodiments, the communication flow paths R, 75, and 824 are formed such that the first and second coolant circulation circuits communicated with each other on the downstream side (pump suction side) by way of example, the communication flow paths R, 75, and 824 may be formed such that the first and second coolant circulation circuits communicate with each other in positions other than the downstream side. Also, in this case, the first and second coolant circulation circuits communicate with each other, thereby adjusting the maximum pressure of the first and second coolant circulation circuits.

(11) In the above first embodiment, the communication flow path R is formed by causing the valve body 224 corresponding to the fourth inlet 22f in the second switching valve 22 to be opened in a small amount on a side of the first flow path 211. However, the communication flow path R may be formed by causing the valve body 224 corresponding to the first to third inlets 22c to 22e in a small amount on a side of the first flow path 211.

What is claimed is:

1. A thermal management system for a vehicle, comprising
    a first pump and a second pump sucking and discharging a liquid heat medium;
    a temperature adjustment target device having a temperature adjusted by the heat medium;
    a heat exchanger exchanging heat with the heat medium;
    numerous flow paths for circulation of the heat medium, including a first pump arrangement flow path in which the first pump is disposed, a second pump arrangement flow path in which the second pump is disposed, and a device arrangement flow path in which at least one of the temperature adjustment target device and the heat exchanger is disposed;
    a first switching portion connected to one end side of each of the numerous flow paths, and adapted to selectively establish communication between the numerous flow paths; and
    a second switching portion connected to the other end side of each of the numerous flow paths, and adapted to selectively establish communication between the numerous flow paths; and
    a reserve tank storing the heat medium therein, wherein
    the first switching portion and the second switching portion are operated such that at least one of the numerous flow paths communicates with the first pump arrangement flow path to form a first heat medium circuit, and that at least another one of the numerous flow paths communicates with the second pump arrangement flow path to form a second heat medium circuit, and
    the reserve tank is configured to set a pressure of a liquid surface of the heat medium stored to a predetermined pressure, and is connected to only one of the numerous flow paths.

2. A thermal management system for a vehicle, comprising:
    a first pump, a second pump, and a third pump sucking and discharging a liquid heat medium;
    a temperature adjustment target device having a temperature adjusted by the heat medium;
    a heat exchanger exchanging heat with the heat medium;
    numerous flow paths for circulation of the heat medium, including a first pump arrangement flow path in which the first pump is disposed, a second pump arrangement flow path in which the second pump is disposed, and a device arrangement flow path in which at least one of the temperature adjustment target device and the heat exchanger is disposed;
    a first switching portion connected to one end side of each of the numerous flow paths, and adapted to selectively establish communication between the numerous flow paths; and
    a second switching portion connected to the other end side of each of the numerous flow paths, and adapted to selectively establish communication between the numerous flow paths;
    a reserve tank storing the heat medium therein;
    a circulation flow path provided with the third pump, and allowing the heat medium to circulate therethrough; and
    at least one connection flow path connecting at least one of the numerous flow paths to the circulation flow path, wherein
    the first switching portion and the second switching portion are operated such that at least one of the numerous flow paths communicates with the first pump arrangement flow path to form a first heat medium circuit, and that at least another one of the numerous flow paths communicates with the second pump arrangement flow path to form a second heat medium circuit, and
    the reserve tank is configured to set a pressure of a liquid surface of the heat medium stored to a predetermined pressure, and is connected to the circulation flow path.

3. A thermal management system for a vehicle, comprising:
    a first pump and a second pump sucking and discharging a liquid heat medium;
    a temperature adjustment target device having a temperature adjusted by the heat medium;
    a heat exchanger exchanging heat with the heat medium to change a temperature of the heat medium;
    numerous flow paths for circulation of the heat medium, including a first pump arrangement flow path in which the first pump is disposed, a second pump arrangement flow path in which the second pump is disposed, and a device arrangement flow path in which at least one of the temperature adjustment target device and the heat exchanger is disposed;
    a first switching portion connected to one end side of each of the numerous flow paths, and adapted to selectively establish communication between the numerous flow paths; and a second switching portion connected to the other end side of each of the numerous flow paths, and adapted to selectively establish communication between the numerous flow paths;

one or two reserve tanks connected to a predetermined flow path of the numerous flow paths, and storing therein the heat medium; and a pressure adjustment valve that opens when an internal pressure of the predetermined flow path or an internal pressure of the reserve tank exceeds a predetermined range, wherein the first switching portion and the second switching portion are operated such that at least one of the numerous flow paths communicates with the first pump arrangement flow path to form a first heat medium circuit, and that at least another one of the numerous flow paths communicates with the second pump arrangement flow path to form a second heat medium circuit.

4. A thermal management system for a vehicle, comprising:

a first pump, a second pump, and a third pump sucking and discharging a liquid heat medium;

a temperature adjustment target device having a temperature adjusted by the heat medium;

a heat exchanger exchanging heat with the heat medium to change a temperature of the heat medium;

numerous flow paths for circulation of the heat medium, including a first pump arrangement flow path in which the first pump is disposed, a second pump arrangement flow path in which the second pump is disposed, and a device arrangement flow path in which at least one of the temperature adjustment target devices and the heat exchanger is disposed;

a first switching portion connected to one end side of each of the numerous flow paths, and adapted to selectively establish communication between the numerous flow paths;

a second switching portion connected to the other end side of each of the numerous flow paths, and adapted to selectively establish communication between the numerous flow paths;

a circulation flow path provided with the third pump, and allowing the heat medium to circulate therethrough;

at least one connection flow path connecting at least one of the numerous flow paths to the circulation flow path;

one or two reserve tanks connected to a predetermined flow path of the numerous flow paths and the circulation flow path, and adapted to store therein the heat medium; and a pressure adjustment valve that opens when an internal pressure of the predetermined flow path or an internal pressure of the reserve tank exceeds a predetermined range, wherein the first switching portion and the second switching portion are operated such that at least one of the numerous flow paths communicates with the first pump arrangement flow path to form a first heat medium circuit, and that at least another one of the numerous flow paths communicates with the second pump arrangement flow path to form a second heat medium circuit.

5. The thermal management system for a vehicle according to claim 1, further comprising:

a communication flow path for communication between the first heat medium circuit and the second heat medium circuit.

6. The thermal management system for a vehicle according to claim 5, further comprising:

a switching target flow path that allows the heat medium to circulate therethrough, the switching target flow path being connected to the communication flow path and the second switching portion.

7. The thermal management system for a vehicle according to claim 6, wherein the switching target flow path is provided with a heat medium circulation device through which the heat medium circulates.

8. The thermal management system for a vehicle according to claim 7, wherein the switching target flow path is provided with a switching target flow-path pump that sucks and discharges the heat medium.

9. The thermal management system for a vehicle according to claim 8, wherein a pressure adjuster adjusting a pressure of the heat medium is attached to the heat medium circulation device.

10. The thermal management system for a vehicle according to claim 5, wherein the second switching portion is a switching valve with a valve body for switching a flow of the heat medium; and the communication flow path is provided inside the second switching portion.

11. The thermal management system for a vehicle according to claim 5, wherein the second switching portion includes a valve body that switches a flow of the heat medium;

one end of the communication flow path is connected to a portion between the valve body and a heat medium suction portion of the first pump in the flow path forming the first heat medium circuit, and the other end of the communication flow path is connected to a portion between the valve body and a heat medium suction portion of the second pump in the flow path forming the second heat medium circuit.

12. The thermal management system for a vehicle according to claim 5, wherein the communication flow path establishes communication between the first heat medium circuit and the second heat medium circuit, at a downstream side of a heat medium flow with respect to at least one of the temperature adjustment target device and the heat exchanger, and at a suction side of each of the first pump and the second pump.

13. The thermal management system for a vehicle according to claim 5, wherein the communication flow path is formed by causing the second switching portion to establish communication between the first pump arrangement flow path and the second pump arrangement flow path.

14. The thermal management system for a vehicle according to claim 5, wherein the second switching portion includes a valve body provided with a first valve body flow path in communication with the first pump arrangement flow path, and a second valve body flow path, and the communication flow path is a flow path formed in the valve body, and establishes communication between the first valve body flow path and the second valve body flow path.

15. The thermal management system for a vehicle according to claim 1, wherein a connection portion of the reserve tank is located at a downstream side of a heat medium flow with respect to at least one of the temperature adjustment target device and the heat exchanger, and at a suction side of at least one of the first pump and the second pump.

16. The thermal management system for a vehicle according to claim 1, wherein
the reserve tank has an inflow-outflow port into which and from which the heat medium flows,
the inflow-outflow port is connected to the first pump arrangement flow path via a main connection flow path that allows the heat medium to circulate therethrough, and
one end of the main connection flow path, opposite to the reserve tank, is connected to a part of the first pump arrangement flow path at a suction side of the first pump.

17. The thermal management system for a vehicle according to claim 1, wherein
the reserve tank has a main inflow-outflow port and a sub-inflow-outflow port, into which and from which the heat medium flows,
the main inflow-outflow port is connected to the first pump arrangement flow path via a main connection flow path that allows the heat medium to circulate therethrough,
the sub-inflow-outflow port is connected to the first pump arrangement flow path via a sub-connection flow path in which a resistance of a flow of the heat medium is larger than that in the main connection flow path,
one end of the main connection flow path, opposite to the reserve tank, is connected to a part of the first pump arrangement flow path at a suction side of the first pump, and
one end of the sub-connection flow path, opposite to the reserve tank, is connected to a part of the first pump arrangement flow path at a discharge side of the first pump.

18. The thermal management system for a vehicle according to claim 3, wherein
the reserve tank has an inflow-outflow port into and from which the heat medium flows,
the inflow-outflow port is connected to the first pump arrangement flow path and the second pump arrangement flow path via a main connection flow path which allows the heat medium to circulate therethrough, and
one end of the main connection flow path, opposite to the reserve tank, is connected to a part of the first pump arrangement flow path at a suction side of the first pump, and connected to a part of the second pump arrangement flow path, at a suction side of the second pump.

19. The thermal management system for a vehicle according to claim 3, wherein
the reserve tank has a main inflow-outflow port and a sub-inflow-outflow port into which and from which the heat medium flows,
the main inflow-outflow port is connected to the first pump arrangement flow path and the second pump arrangement flow path via a main connection flow path that allows the heat medium to circulate therethrough, and
the sub-inflow-outflow port is connected to the first pump arrangement flow path and the second pump arrangement flow path via a sub-connection flow path having a resistance of the flow of the heat medium larger than that in the main connection flow path,
one end of the main connection flow path opposite to the reserve tank is connected to a part of the first pump arrangement flow path at a suction side of the first pump, and connected to a part of the second pump arrangement flow path at a suction side of the second pump, and
one end of the sub-connection flow path, opposite to the reserve tank, is connected to a part of the first pump arrangement flow path at a discharge side of the first pump, and connected to a part of the second pump arrangement flow path at a discharge side of the second pump.

20. The thermal management system for a vehicle according to claim 3, wherein
only the one reserve tank is provided,
the predetermined flow path is at least one of a first circuit formation flow path forming the first heat medium circuit, and a second circuit formation flow path forming the second heat medium circuit, and
the one reserve tank is configured to set a pressure of a liquid surface of the stored heat medium to an atmospheric pressure, and is connected to the at least one circuit formation flow path via the pressure adjustment valve.

21. The thermal management system for a vehicle according to claim 3, wherein
the two reserve tanks are provided,
one of the two reserve tanks is connected to a first circuit formation flow path forming the first heat medium circuit,
the other one of the two reserve tanks is connected to a second circuit formation flow path forming the second heat medium circuit,
the pressure adjustment valve is provided in both of the one reserve tank and the other reserve tank,
the pressure adjustment valve provided in the one reserve tank is open when an internal pressure of the one reserve tank exceeds a first predetermined range, and
the pressure adjustment valve provided in the other reserve tank is open when an internal pressure of the other reserve tank exceeds a second predetermined range.

22. The thermal management system for a vehicle according to claim 1, wherein the predetermined pressure is an atmospheric pressure.

* * * * *